US012589515B2

(12) United States Patent
Suzuki et al.

(10) Patent No.: US 12,589,515 B2
(45) Date of Patent: Mar. 31, 2026

(54) WORKING MACHINE INCLUDING A MOTOR ACCOMMODATING PART AND A BATTERY ACCOMMODATING PART

(71) Applicant: Makita Corporation, Anjo (JP)

(72) Inventors: Daisuke Suzuki, Anjo (JP); Masayoshi Okumi, Anjo (JP); Hideki Kachi, Anjo (JP)

(73) Assignee: MAKITA CORPORATION, Anjo (JP)

( * ) Notice: Subject to any disclaimer, the term of this patent is extended or adjusted under 35 U.S.C. 154(b) by 553 days.

(21) Appl. No.: 18/178,920

(22) Filed: Mar. 6, 2023

(65) Prior Publication Data

US 2023/0286186 A1 Sep. 14, 2023

(30) Foreign Application Priority Data

Mar. 10, 2022 (JP) ................................. 2022-037159

(51) Int. Cl.
*H02K 5/20* (2006.01)
*B27B 17/02* (2006.01)
(Continued)

(52) U.S. Cl.
CPC .............. *B27B 17/08* (2013.01); *B27B 17/02* (2013.01); *H02K 5/207* (2021.01); *H02K 9/06* (2013.01); *H02K 7/145* (2013.01)

(58) Field of Classification Search
CPC ............ H02K 5/20; H02K 5/207; H02K 7/14; H02K 7/145; H02K 9/02; H02K 9/04; H02K 9/06; B27B 17/02; B27B 17/025;

B27B 17/04; B27B 17/08; B27B 17/083; B27B 17/086; B27B 17/10; B25F 5/00; B25F 5/008; B23D 57/02; B23D 57/023
See application file for complete search history.

(56) References Cited

U.S. PATENT DOCUMENTS

2012/0066916 A1 3/2012 Heinzelmann et al.
2015/0359170 A1* 12/2015 Ito ........................... A01D 34/78
56/16.9
(Continued)

FOREIGN PATENT DOCUMENTS

JP 2020137264 A * 8/2020 ............. H02K 9/223
JP 2021-030314 A 3/2021
(Continued)

OTHER PUBLICATIONS

Kanda, Machine Translation of JP2020137264, Aug. 2020 (Year: 2020).*
(Continued)

*Primary Examiner* — Eric Johnson
(74) *Attorney, Agent, or Firm* — Sughrue Mion, PLLC

(57) ABSTRACT

A working machine may include a working part, a body including a motor accommodating part, a fan accommodated in the motor accommodating part and a motor accommodated in the motor accommodating part and configured to drive the working part and the fan. The fan may include a disk plate including a circular opening defined at a center of the disk plate, a plurality of vanes attached to the disk plate, and a cover part. The plurality of vanes may be covered by the disk plate and the cover part in an axial direction.

8 Claims, 18 Drawing Sheets

(51) Int. Cl.
　　 *B27B 17/08* 　　　　(2006.01)
　　 *H02K 7/14* 　　　　(2006.01)
　　 *H02K 9/06* 　　　　(2006.01)

(56) References Cited

U.S. PATENT DOCUMENTS

2020/0177052 A1 * 　6/2020 　Fujiwara ................. H02K 9/06
2021/0046632 A1 　　2/2021 　Osawa et al.

FOREIGN PATENT DOCUMENTS

| | | | | | |
|---|---|---|---|---|---|
| JP | 2021037562 | A | * | 3/2021 | ............. B25B 21/02 |
| JP | 2021186924 | A | * | 12/2021 | |
| WO | WO-2013032372 | A1 | * | 3/2013 | ............. A01G 3/053 |
| WO | WO-2021104723 | A1 | * | 6/2021 | ................ B25F 5/02 |

OTHER PUBLICATIONS

Hirabayashi, Machine Translation of JP2021037562, Mar. 2021 (Year: 2021).*
Takahashi, Machine Translation of JP2021186924, Dec. 2021 (Year: 2021).*
Japanese Office Action dated Aug. 26, 2025, issued in Japanese application 2022-037159.

* cited by examiner

UP

RIGHT

FRONT

REAR

LEFT

DOWN

FIG. 2

FRONT ← → REAR

UP ↑ ↓ DOWN

RIGHT

FRONT

REAR

LEFT

DOWN (Second Embodiment)

UP

RIGHT ← → LEFT

DOWN (Third Embodiment)

(Third Embodiment)

REAR

RIGHT ←——→ LEFT

FRONT

WORKING MACHINE INCLUDING A MOTOR ACCOMMODATING PART AND A BATTERY ACCOMMODATING PART

REFERENCE TO RELATED APPLICATIONS

This application claims priority to Japanese Patent Application No. 2022-037159 filed on Mar. 10, 2022, the contents of which are hereby incorporated by reference into the present application.

BACKGROUND ART

US Patent Application Publication No. 2012/66916 describes a working machine which includes: a body including a motor accommodating chamber; a working part attached to the body; a fan accommodated in the motor accommodating chamber; and a motor accommodated in the motor accommodating chamber and configured to drive the working part and the fan. The fan includes a disk plate including a circular opening defined at a center of the disk plate; and a plurality of vanes attached to the disk plate.

DESCRIPTION

Summary

In the working machine described in US Patent Application Publication No. 2012/66916, the motor accommodated in the motor accommodating chamber may not be cooled sufficiently due to the amount of air suctioned in the motor accommodating chamber being small.

The present teachings provide an art configured to improve cooling performance of a motor in a working machine.

A working machine disclosed herein may comprise: a working part; a body including a motor accommodating part; a fan accommodated in the motor accommodating part; and a motor accommodated in the motor accommodating part and configured to drive the working part and the fan, wherein the fan comprises: a disk plate including a circular opening defined at a center of the disk plate; a plurality of vanes attached to the disk plate; and a cover part, and wherein the plurality of vanes is covered by the disk plate and the cover part in an axial direction.

According to the above configuration, the plurality of vanes in the fan is covered by the disk plate and the cover part in the axial direction. In this case, paths in the radial direction are defined by the plurality of vanes, the disk plate, and the cover part. According to such configuration, an amount of air suctioned into the motor accommodating part by the fan can be increased as compared to a fan in which one side in the axial direction of the plurality of vanes is not covered by the cover part. Accordingly, cooling performance for a motor accommodated in a motor accommodating part can be improved.

BRIEF DESCRIPTION OF THE DRAWINGS

FIG. 2 illustrates a left side view of the chainsaw 2 according to the first embodiment from left side.

FIG. 4 illustrates a perspective view of the chainsaw 2 according to the first embodiment with a battery cover 50 and a battery pack 200 removed therefrom, seen from the rear left upper side.

DETAILED DESCRIPTION

Figure 1:
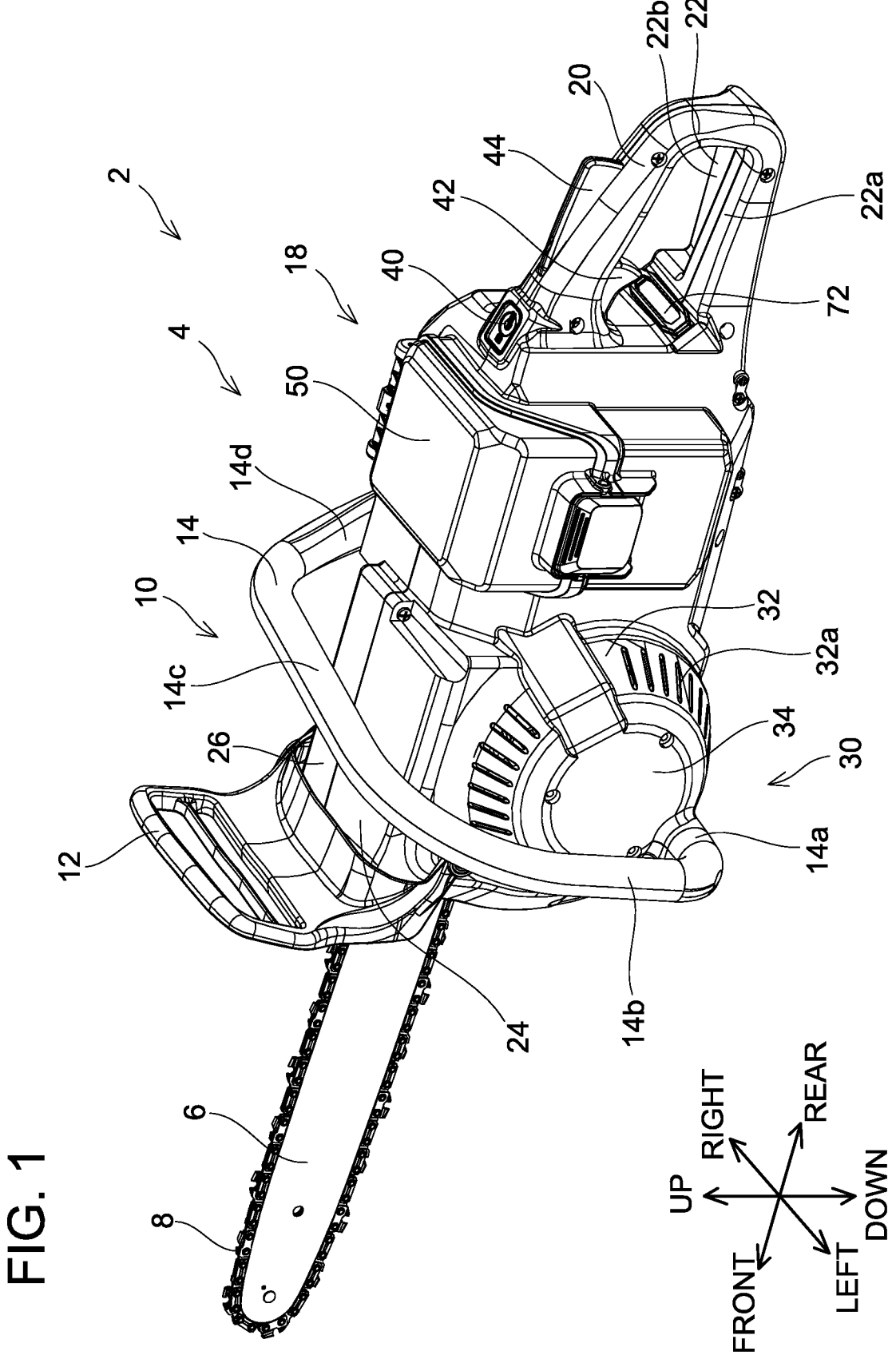
FIG. 1 illustrates a perspective view of a chainsaw 2 according to a first embodiment seen from rear left upper side.

Representative, non-limiting examples of the disclosure herein will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved working machines, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a working machine may comprise: a working part; a body including a motor accommodating part; a fan accommodated in the motor accommodating part; and a motor accommodated in the motor accommodating part and configured to drive the working part and the fan, wherein the fan comprises: a disk plate including a circular opening defined at a center of the disk plate; a plurality of vanes attached to the disk plate; and a cover part, and wherein the plurality of vanes is covered by the disk plate and the cover part in an axial direction.

In one or more embodiments, the cover part may be fixed to the plurality of vanes.

According to the above configuration, paths in the radial direction are securely defined by the plurality of vanes, the disk plate, and the cover part. Accordingly, the amount of air suctioned in the motor accommodating part can be increased, by which the cooling performance of the motor accommodated in the motor accommodating part can be improved.

In one or more embodiments, the working machine may further comprise a motor cover accommodating the motor. Fins protruding outward may be disposed on an outer peripheral surface of the motor cover.

According to the above configuration, the air suctioned into the motor accommodating part by the fan makes contact with the fins. When the air contacts the fins, the motor accommodated in the motor cover is cooled. Accordingly, cooling performance for the motor can be improved.

In one or more embodiments, the working machine may further comprise a motor cover configured to cover the motor in the motor accommodating part. The motor cover may comprise a waterproof structure that prevents entry of water.

When the motor cover has a waterproof structure, air does not flow into the motor cover even if the air is suctioned into the motor accommodating part by the fan. In this case, the motor accommodated in the motor cover is cooled by the air being brought in contact with the outer peripheral surface of the motor cover. That is, the outer peripheral surface of the motor cover needs to be exposed to a great amount of air as compared to the configuration where the air flows into the motor cover. According to the above configuration, a great amount of air is suctioned into the motor accommodating part by the fan. Accordingly, cooling performance for the motor can be improved while attachment of water on the motor is prevented.

In one or more embodiments, the body may comprise: a battery pack; a battery accommodating part configured to accommodate the battery pack; and a duct. The battery accommodating part may comprise a first air intake opening for intaking air from inside of the body into the battery accommodating part and a first air exhaust opening for exhausting air from the battery accommodating part to the inside of the body. The motor accommodating part may comprise: a wall positioned on a first side of the motor in the axial direction and defining the motor accommodating part; and a second air intake opening defined on the wall. One end of the duct may be connected to the battery accommodating part. Another end of the duct may face the second air intake opening on the first side of the second air intake opening.

According to the above configuration, when the fan is driven, air within the battery accommodating part is suctioned in to the duct. Inside of the battery accommodating part is put under negative pressure when the air within the battery accommodating part has been suctioned into the duct. In this case, the air inside the body starts to be suctioned into the battery accommodating part. Due to this, the battery pack within the battery accommodating part is cooled. Accordingly, the fan makes it possible for both the motor and the battery pack to be cooled.

In one or more embodiments, an opening defined on a surface of the other end of duct may have an opening area being one-third or more of an opening area of the second air intake opening. The surface of the other end of duct may face the second air intake opening.

According to the above configuration, the amount of air within the battery accommodating part which is suctioned into the duct can be increased. In this case, the amount of air which is suctioned into the battery accommodating part from the inside of the body can be increased as well. Accordingly, cooling performance for the battery can be improved.

In one or more embodiments, the body may comprise a third air intake opening for intaking air from outside of the body into the inside of the body. In a direction orthogonal to the axial direction, the battery accommodating part may be disposed between the motor accommodating part and the third air intake opening.

According to the above configuration, the air suctioned into the inside of the body from the third air intake opening can be utilized to cool the battery pack within the battery accommodating part. Accordingly, cooling performance for the battery pack can be improved as compared to a configuration where no third air intake opening is provided.

In one or more embodiments, the working machine may be a chainsaw.

A chainsaw has a relatively-high power output. Due to this, the motor easily generates heat. According to the above configuration, it is advantageous that the motor within the motor accommodating part can be suitably cooled.

First Embodiment

Figure 2:
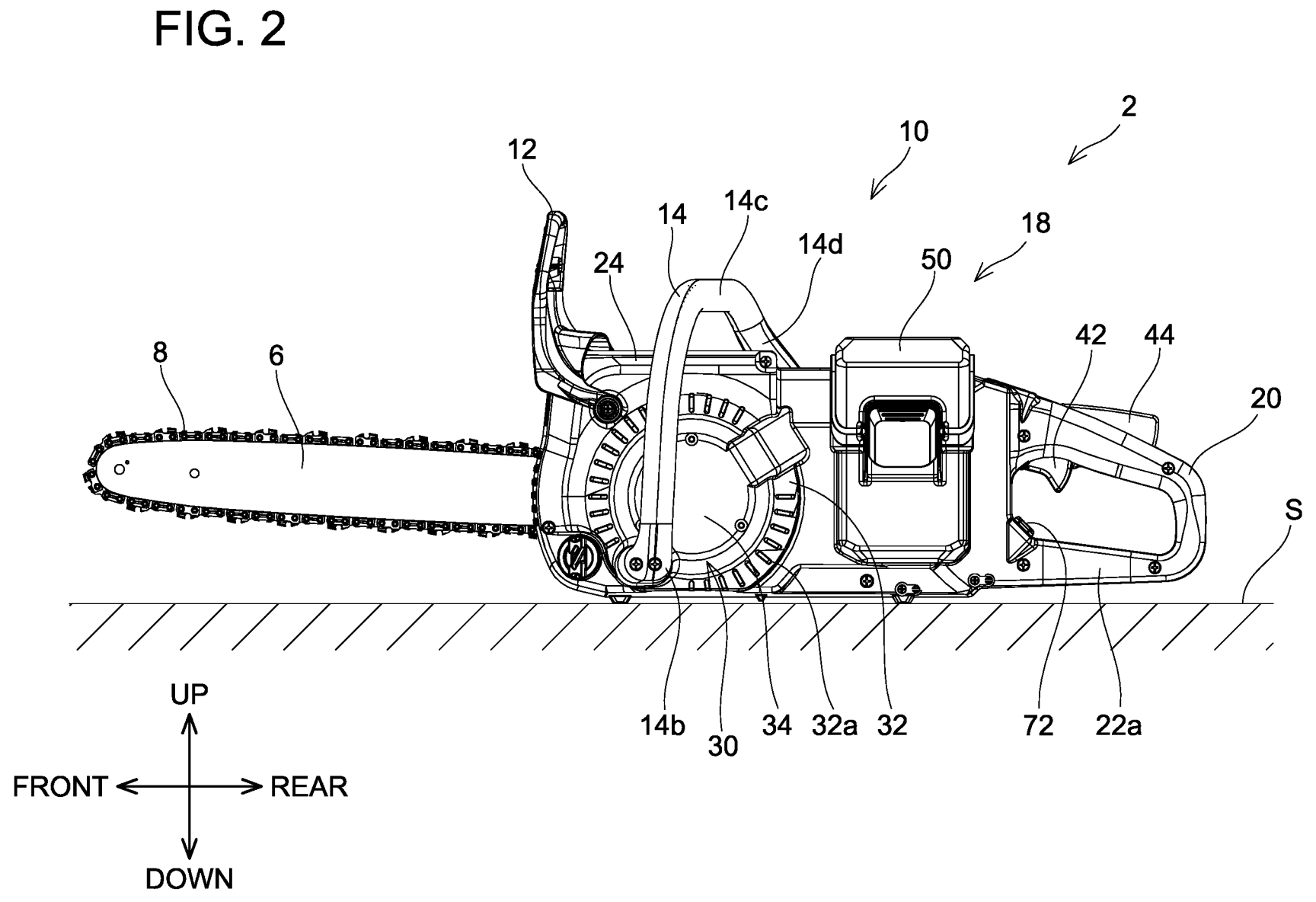

As shown in FIG. 1, the chainsaw 2 comprises a body 4, a guide bar 6, and a saw chain 8. The guide bar 6 is an elongated plate member attached to the body 4 so as to protrude frontward from the body 4. The guide bar 6 is constituted of metal material such as iron. The saw chain 8 comprises a plurality of interlocked cutters and is attached along a circumference of the guide bar 6. In the following description, when the chainsaw 2 is placed on a horizontal placement surface S such as ground as shown in FIG. 2, a direction orthogonal to the placement surface S is an up-down direction of the chainsaw 2; a direction which projects a longitudinal direction of the guide bar 6 on the placement surface S is a front-rear direction of the chainsaw 2; and a direction orthogonal to the up-down direction and the front-rear direction is a left-right direction of the chainsaw 2.

As shown in FIG. 1, the body 4 comprises a body housing 10, a front hand guard 12, a front handle 14, a sprocket cover 16 (see FIG. 3), a battery accommodating part 18, a rear handle 20, and a rear hand guard 22. The body housing 10 is composed of a left housing 24 and a right housing 26. The body housing 10 has a substantially cuboid shape with its longitudinal direction being the front-rear direction of the body 4.

A front air-intake part 30 protruding leftward is disposed on a left surface of the left housing 24. The front air-intake part 30 includes a truncated cone portion 32 and a flat portion 34. The flat portion 34 is disposed at a left end of the truncated cone portion 32. The truncated cone portion 32 has its diameter increasing from left toward right. The truncated cone portion 32 comprises a plurality of outer air intake openings 32a. The plural outer air intake openings 32a are aligned along a circumferential direction of the truncated cone portion 32. Each of the plural outer air intake openings 32a has an elongated hole shape, and has its longitudinal direction being parallel to a direction in which a generatrix of the truncated cone portion 32 extends.

Figure 3:
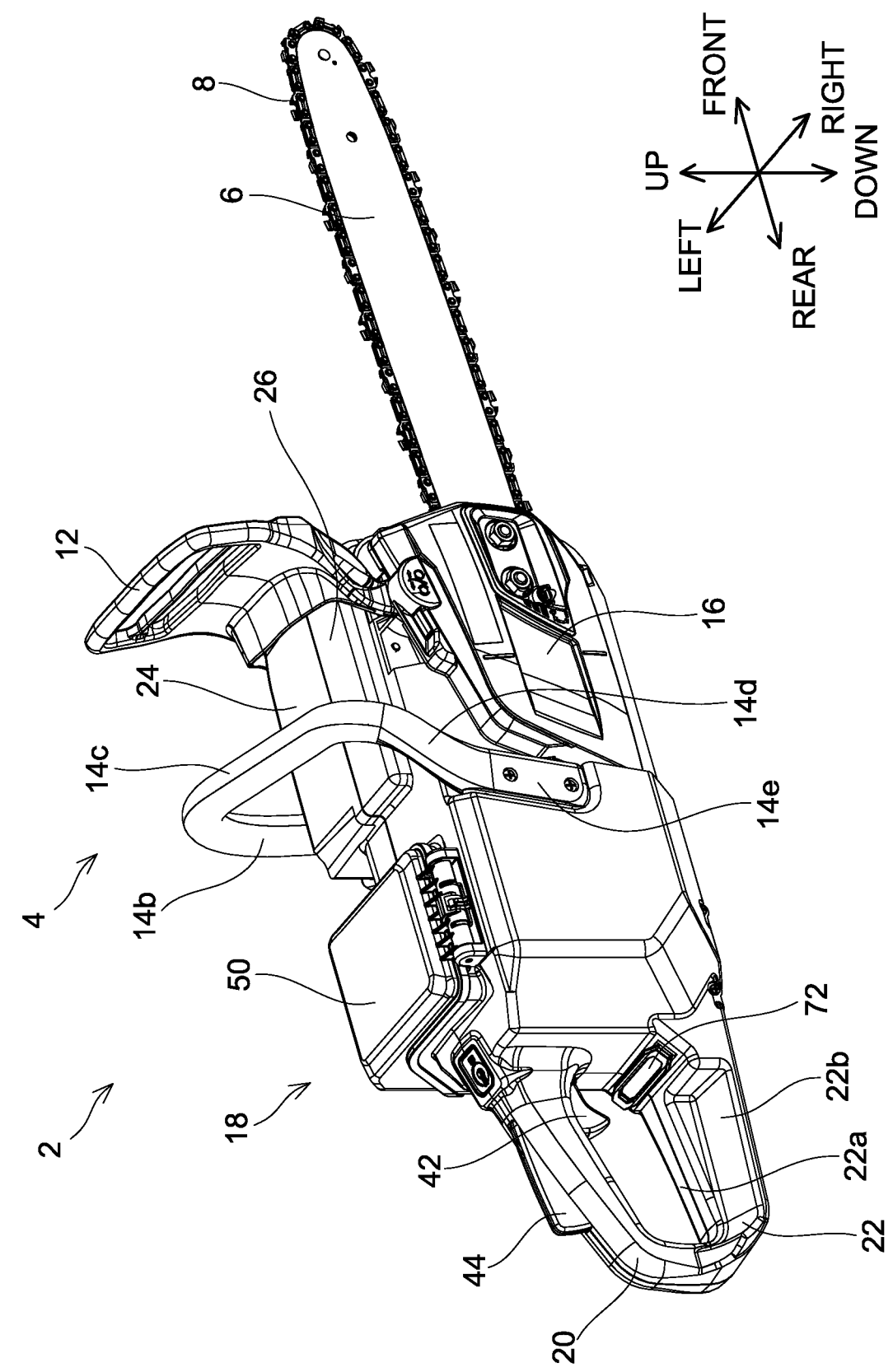
FIG. 3 illustrates a perspective view of the chainsaw 2 according to the first embodiment from rear right upper side.

The front handle 14 includes a left fixed portion 14a extending leftward from a front lower part of the left housing 24 (specifically, the front air-intake part 30), a left grip portion 14b extending upward from a left end of the left fixed portion 14a, an upper grip portion 14c extending rightward from an upper end of the left grip portion 14b, a right grip portion 14d extending rear-downward from a right end of the upper grip portion 14c, and a right fixed portion 14e (see FIG. 3) extending downward from a lower end of the right grip portion 14d. The left fixed portion 14a is fixed by screw(s) to the front lower part of the left housing 24. As shown in FIG. 3, the right fixed portion 14e is fixed by screw(s) to the right housing 26 at a position on a rear side of the sprocket cover 16. The front hand guard 12 is pivotably supported to a front upper part of the body housing 10. The front hand guard 12 is disposed on a front side of the front handle 14. The front hand guard 12 is configured to protect a user's hand gripping the upper grip portion 14c of the front handle 14.

The rear handle 20 extends rear-downward from an upper part of a rear surface of the body housing 10 and curves downward. The rear hand guard 22 extends rearward from a lower part of the rear surface of the body housing 10 to be coupled to a lower end of the rear handle 20. The rear hand guard 22 comprises a first guard portion 22a located directly below the rear handle 20 and a second guard portion 22b extending rightward from the first guard portion 22a. The rear hand guard 22 is configured to protect a user's hand gripping the rear handle 20.

A power button 40 for the user to switch the power of the chainsaw 2 on and off is disposed on an upper surface near a front end of the rear handle 20. A trigger lever 42 for the user to control rotational operation of the saw chain 8 is disposed on a lower surface near the front end of the rear handle 20. A lock lever 44 configured to switch between a state allowing user's operation on the trigger lever 42 and a state prohibiting the user's operation on the trigger lever 42 is disposed on the upper surface of the rear handle 20. While the user is using the chainsaw 2, the user holds the chainsaw 2 by gripping the rear handle 20 with his/her right hand and gripping the front handle 14 with his/her left hand. Once the user has pressed down the lock lever 44 of the rear handle 20 with his/her palm of the right hand from this state, the trigger lever 42 is in the state of being allowed for operation. The saw chain 8 starts to rotate by the user lifting up the trigger lever 42 with his/her index finger of the right hand in this state.

Figure 4:
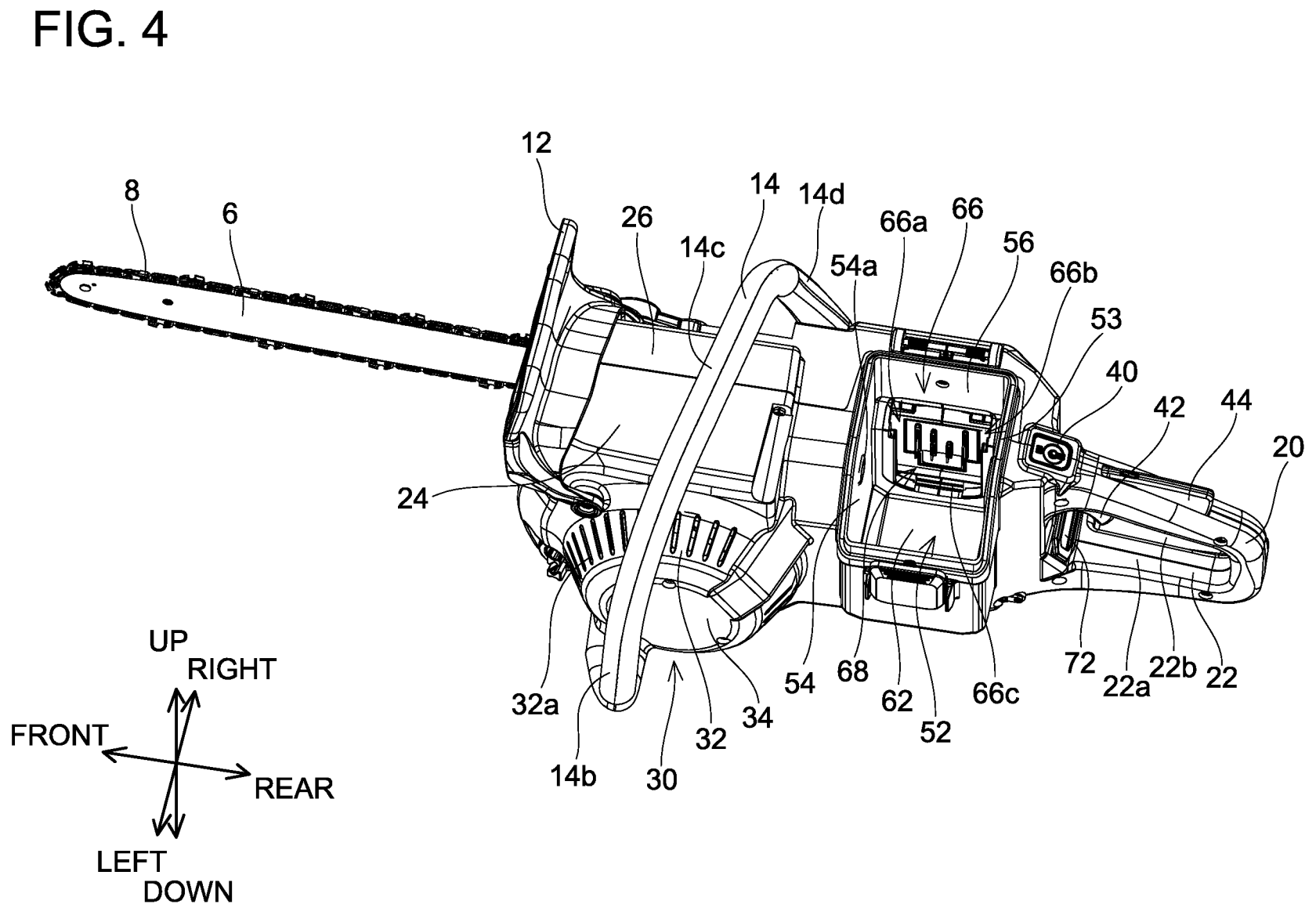
Figure 5:
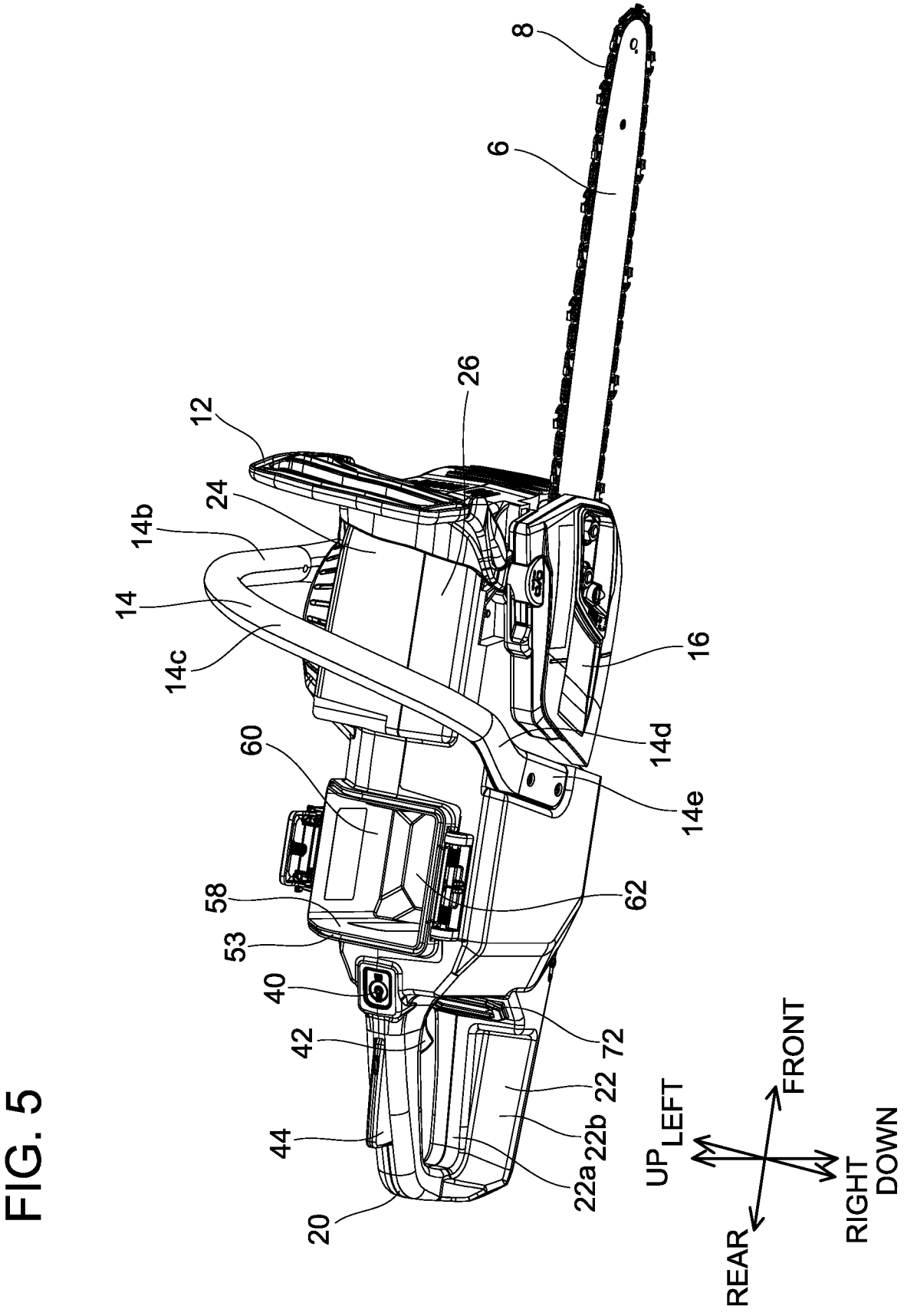
FIG. 5 illustrates a perspective view of the chainsaw 2 according to the first embodiment with the battery cover 50 and the battery pack 200 removed therefrom, seen from front right upper side.

The battery accommodating part 18 is disposed between the front handle 14 and the rear handle 20. The battery accommodating part 18 comprises an openable battery cover 50 and a battery interface (hereafter, may be termed "IF") 52 (see FIG. 4). As shown in FIG. 4, the battery IF 52 comprises an IF front surface 54, an IF right surface 56, an IF rear surface 58 (see FIG. 5), an IF left surface 60 (see FIG. 5), and an IF bottom surface 62. The IF front surface 54 extends along the left-right direction and the front-rear direction and faces rearward. The IF right surface 56 extends along the front-rear direction and the up-down direction and faces leftward. The IF bottom surface 62 extends along the front-rear direction and the left-right direction, and faces upward. As shown in FIG. 5, the IF rear surface 58 extends along the left-right direction and the up-down direction, and faces frontward. The IF left surface 60 extends along the front-rear direction and the up-down direction, and faces rightward.

Figure 6:
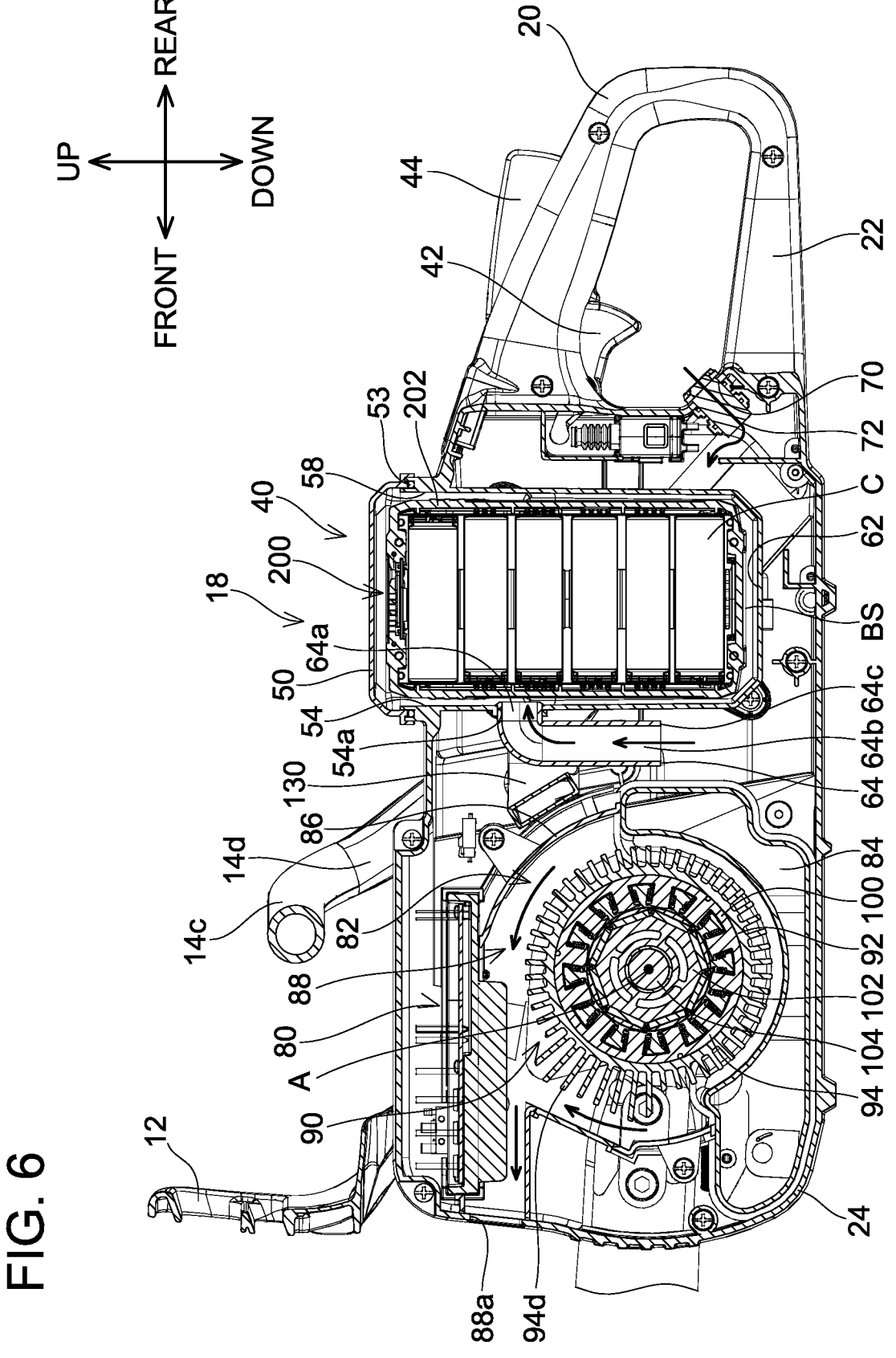
FIG. 6 illustrates a left cross-sectional view of the chainsaw 2 according to the first embodiment seen from the left side.

As shown in FIG. 4, the IF front surface 54 has an IF-side air intake opening 54a defined therein. As shown in FIG. 6, an air intake tube 64 is coupled to the IF-side air intake opening 54a. The air intake tube 64 is constituted of rubber material, for example. Alternatively in a variant, the air intake tube 64 may be constituted of plastic, for example. The air intake tube 64 comprises a first air path 64a extending frontward from the IF-side air intake opening 54a and a second air path 64b extending from a front end of the first air path 64a to curve downward. An opening at an end 64c of the second air path 64b faces vertically downward. In the present embodiment, the air intake tube 64 is attached to the IF front surface 54 so that the opening at the end 64c faces vertically downward when the chainsaw 2 is in the state shown in FIG. 2. In a variant, the air intake tube 64 may be rotatably attached to the IF-side air intake opening 54a so that the opening at the end 64c faces vertically downward not matter what state the chainsaw 2 is in.

Figure 7:
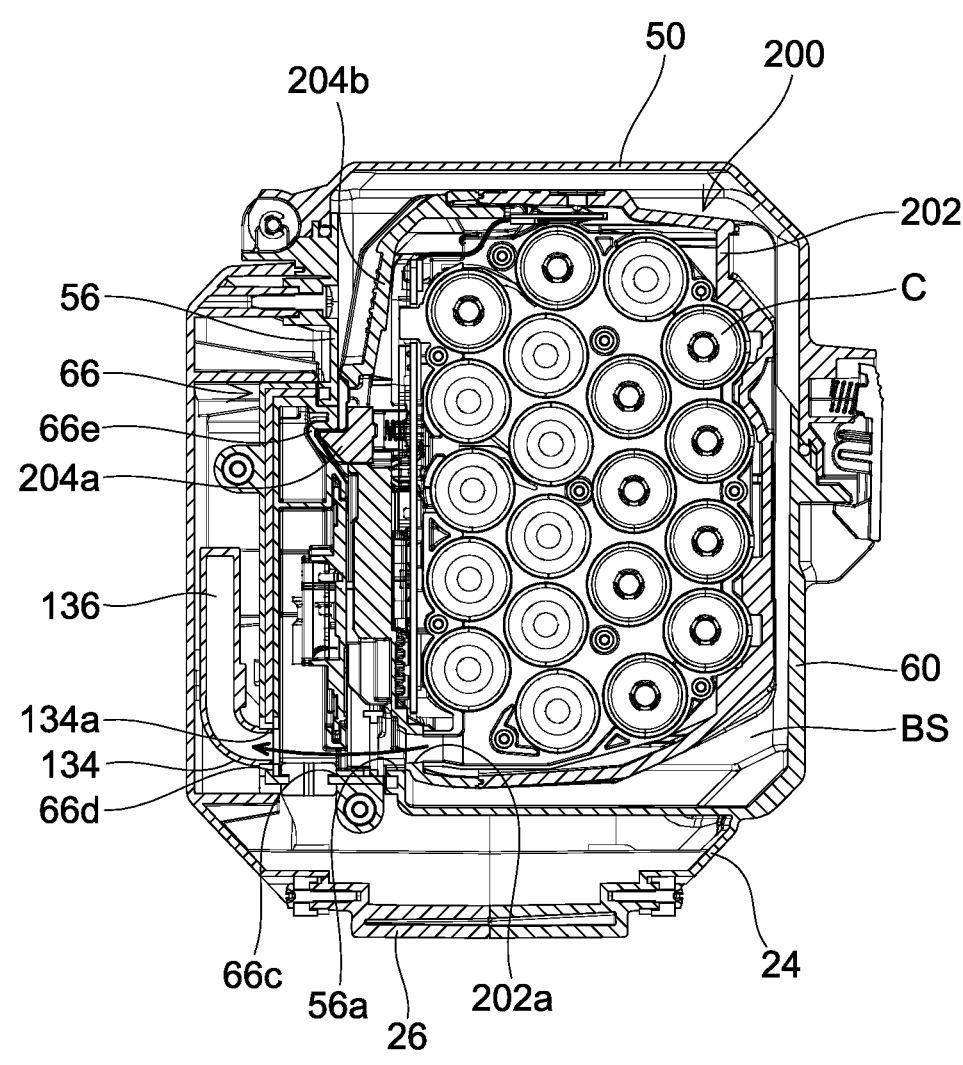
FIG. 7 illustrates a front cross-sectional view of the chainsaw 2 according to the first embodiment seen from a front side.
Figure 7:
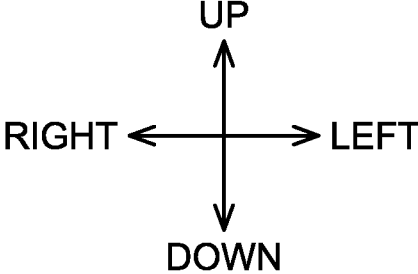

As shown in FIG. 7, the IF right surface 56 has a right opening 56a defined therein. The receptacle unit 66 is disposed in the right opening 56a. As shown in FIG. 4, a first front rail 66a extending in the up-down direction is disposed at a front end of the receptacle unit 66, and a first rear rail 66b extending in the up-down direction is disposed at a rear end of the receptacle unit 66. The receptacle unit 66 comprises five machine-side terminals 68 held therein. The five machine-side terminals 68 are disposed between the first front rail 66a and the first rear rail 66b, and aligned in the front-rear direction. An inner air exhaust hole 66c is defined in a lower part of the receptacle unit 66. As shown in FIG. 7, an outer air exhaust hole 66d is defined in a lower part of a rear surface of the receptacle unit 66. A battery accommodating space BS is defined by the battery cover 50 and the battery IF 52. As shown in FIG. 6, a sealer 53 is disposed where the battery cover 50 and the battery IF 52 contact each other while the battery cover 50 is closed. Due to this, inside of the battery accommodating part 18 is sealed while the battery cover 50 is closed.

As shown in FIG. 6, a rear air intake opening 70 is defined in a lower part of the rear surface of the body housing 10. The rear air intake opening 70 has an elongated hole shape, and has its longitudinal direction being parallel to the left-right direction. A sponge 72 is mounted in the rear air intake opening 70. The sponge 72 is configured to allow entry of air into the body housing 10 and also suppress entry of water and/or dust into the body housing 10.

A control unit 80, a motor unit 82, an oil tank 84, and an inner housing 86 are arranged in a front part inside the body housing 10. The control unit 80, the motor unit 82, and the oil tank 84 are located to the front of the battery accommodating part 18. The control unit 80 is arranged above the motor unit 82. The oil tank 84 is configured to store lubricant for lubricating the saw chain 8. A motor accommodating part 88 which accommodates the motor unit 82 is disposed in the front part inside the body housing 10. The motor accommodating part 88 is defined by the left housing 24 (see FIG. 8), the right housing 26, the control unit 80, the oil tank 84, and the inner housing 86. The motor accommodating part 88 has a front surface having front air exhaust opening 88a defined therein. The motor unit 82 is fixed to the left housing 24 by screw(s).

Figure 8:
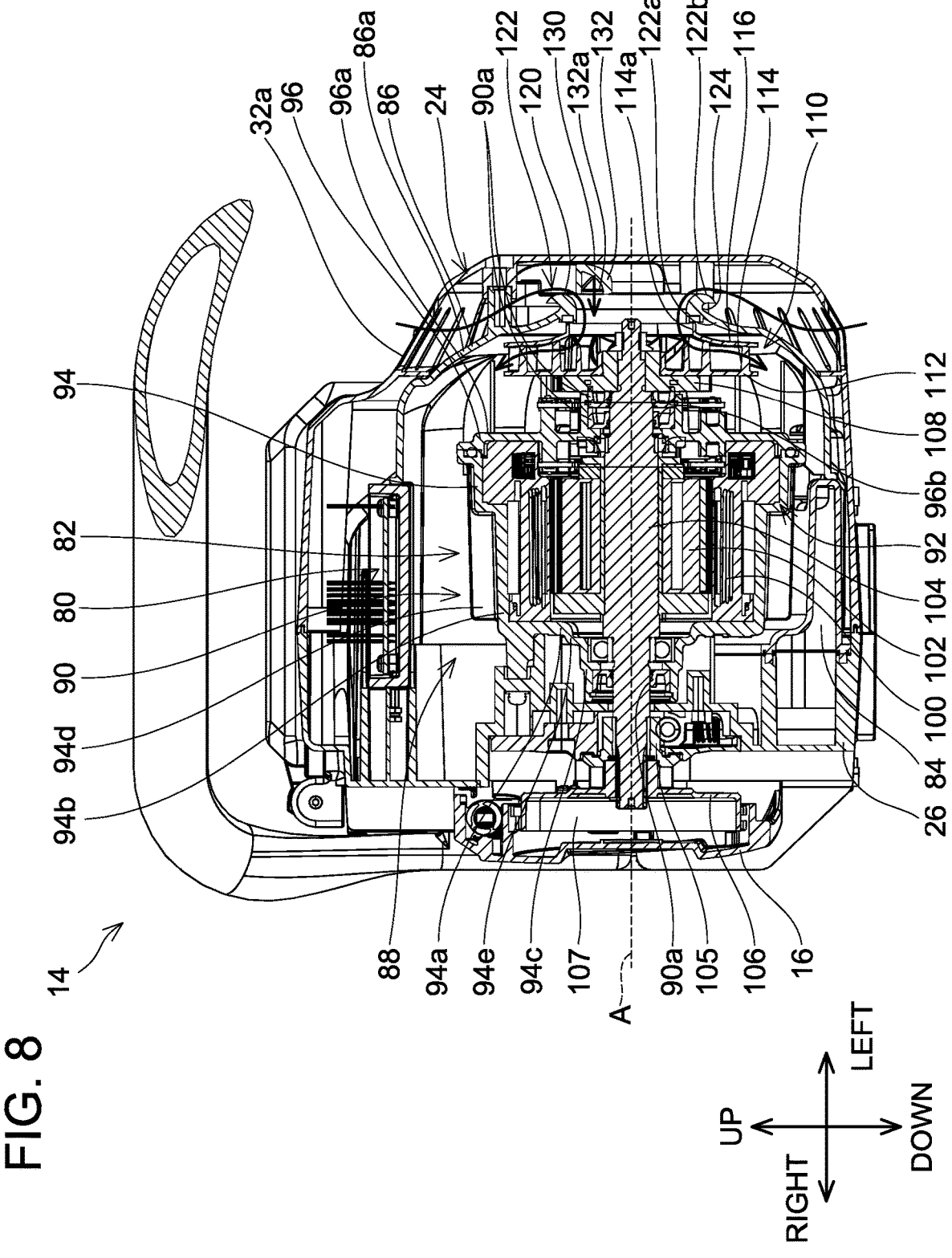
FIG. 8 illustrates a front cross-sectional view of the chainsaw 2 according to the first embodiment from the front.

The motor unit 82 comprises a motor cover 90 and a motor 92. The motor cover 90 has a waterproof structure. As shown in FIG. 8, the motor cover 90 comprises a cover body 94 and a lid 96. The cover body 94 comprises a body-side disk portion 94a, a first cylinder portion 94b being cylindrical, and a second cylinder portion 94c being cylindrical. A center of the body-side disk portion 94a comprises a body-side opening 94e defined therein. The first cylinder portion 94b extends leftward from an outer end in a radial direction of the body-side disk portion 94a. The second cylinder portion 94c extends rightward from an outer circumferential end of the body-side opening 94e of the body-side disk portion 94a. The first cylinder portion 94b comprises a plurality of fins 94d extending radially outward. The lid 96 has a lid-side disk portion 96a. A center of the lid-side disk portion 96a comprises a lid-side circular opening 96b defined therein. The lid-side disk portion 96a covers an opening at a left-side end of the first cylinder portion 94b.

The motor 92 is waterproofed by the motor cover 90. The motor 92 is an inner rotor type DC brushless motor. The motor 92 comprises a stator 100, a rotor 102 disposed on the inner side relative to the stator 100, and an output shaft 104 disposed so as to pass through centers of the stator 100 and the rotor 102 and fitted with the rotor 102. The output shaft 104 extends along an axial direction A. The axial direction A is parallel to the left-right direction. A left end of the output shaft 104 is located to the left of a left end of the motor cover 90, and a right end of the output shaft 104 is located to the right of a right side of the motor cover 90. That is, the output shaft 104 penetrates the motor cover 90 in the left-right direction. In the motor cover 90, a plurality of waterproof members 90a is disposed where the output shaft 104 penetrates the motor cover 90.

A worm gear 105 and a sprocket 106 are fixed to the right end of the output shaft 104. A left end of the sprocket 106 meshes with the worm gear 105, and a brake drum 107 is disposed on a right end of the sprocket 106. The saw chain 8 (see FIG. 1) is wrapped around the sprocket 106 from the guide bar 6. When the motor 92 is driven, the sprocket 106 revolves along with the output shaft 104, by which the saw chain 8 revolves around the sprocket 106 and the guide bar 6. When the user presses down the front hand guard 12 (see FIG. 1) frontward with the motor 92 running, rotation of the output shaft 104 is braked via the brake drum 107.

Figure 9:
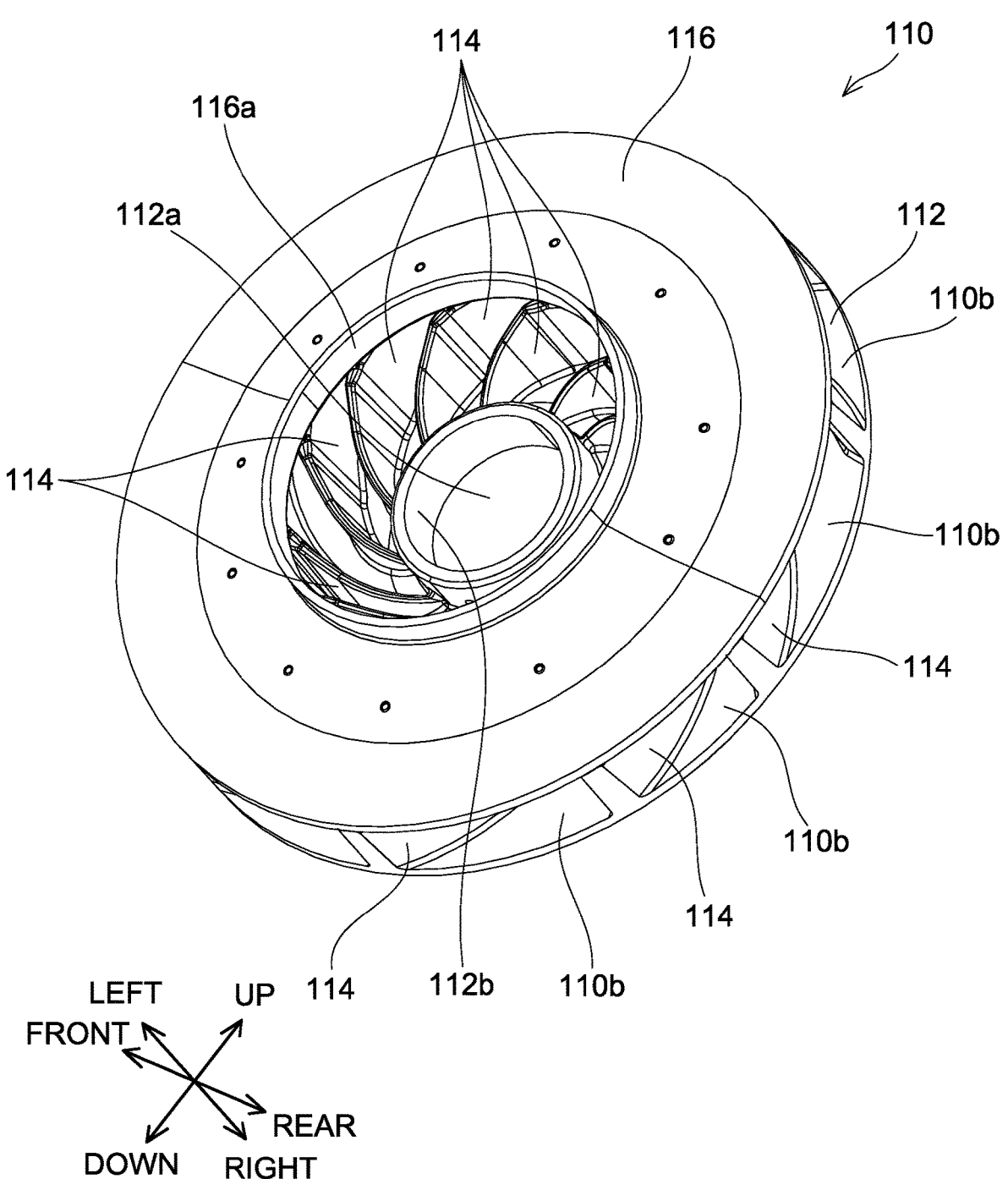
FIG. 9 illustrates a perspective view of a fan 110 according to the first embodiment seen from front left upper side.
Figure 10:
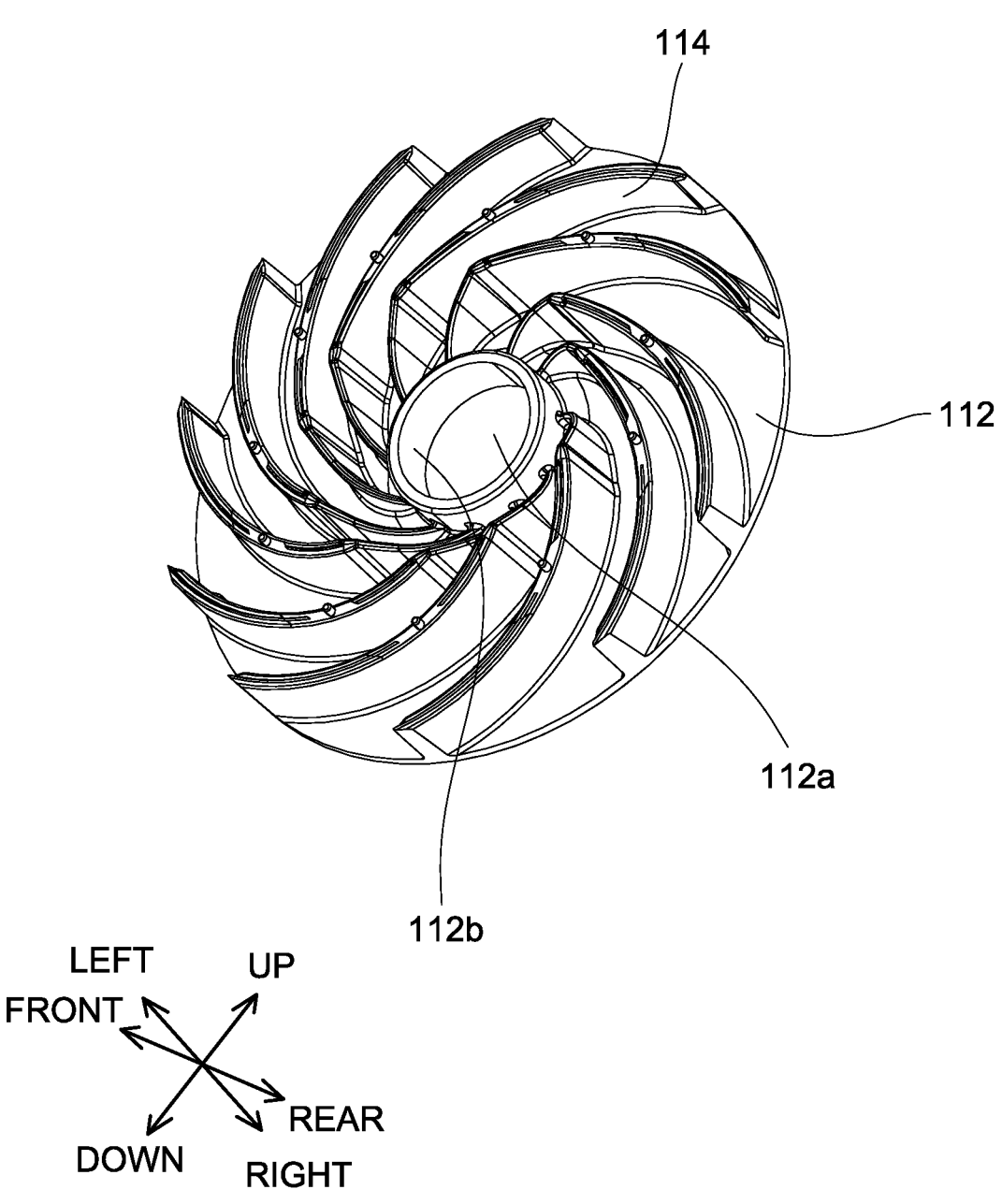
FIG. 10 illustrates a perspective view of the fan 110 according to the first embodiment with a cover part removed therefrom from the front left upper side.
Figure 11:
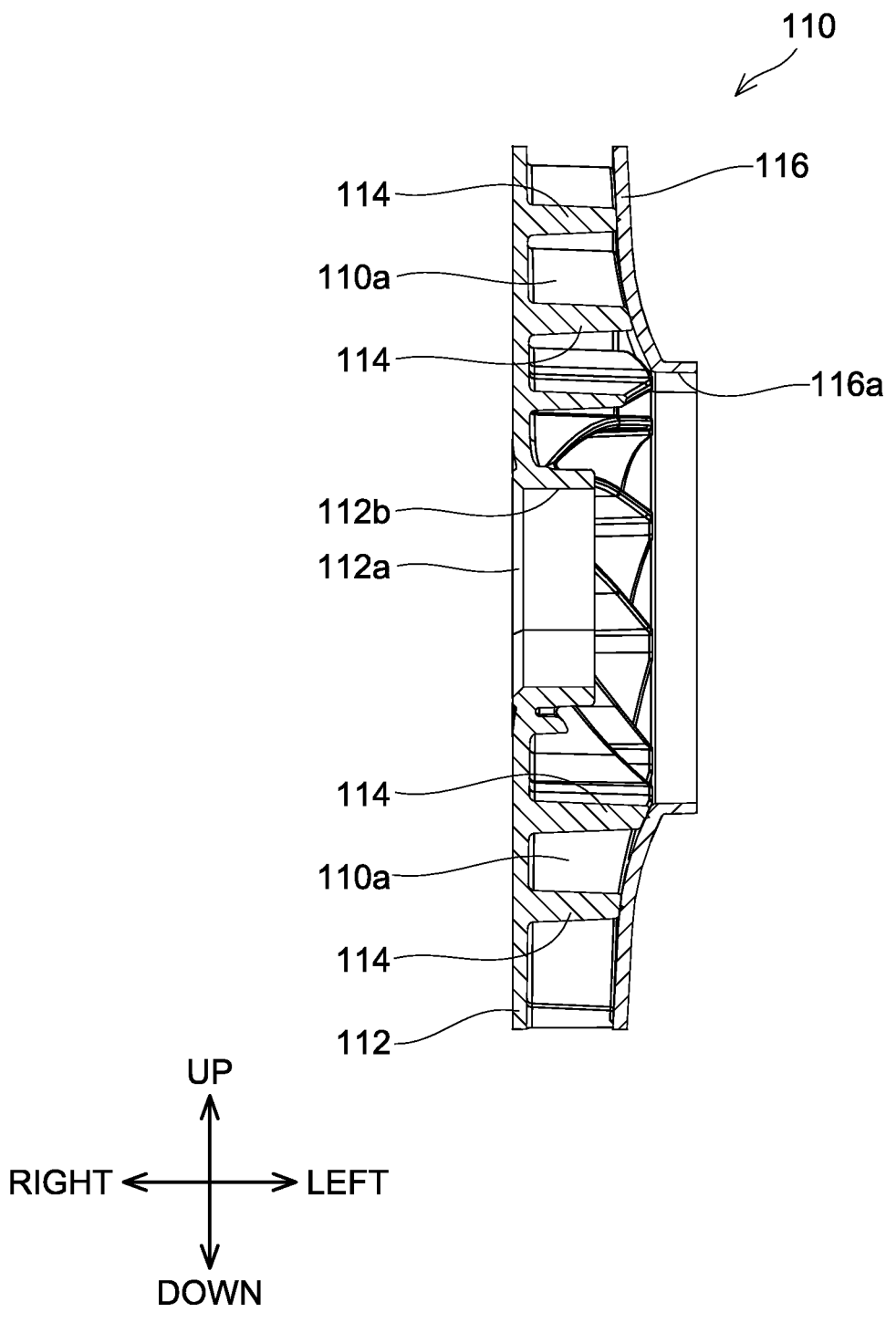
FIG. 11 illustrates a front cross-sectional view of the fan 110 according to the first embodiment seen the front side.

The fan 110 is mounted on a left end of the output shaft 104 via a bush 108. As shown in FIG. 9, the fan 110 is a so-called enclosed fan. The fan 110 comprises a fan disk plate 112, a plurality of vanes 114, and a cover part 116. A central opening 112a is defined at a center of the fan disk plate 112. The fan disk plate 112 has a cylindrical rib portion 112b extending frontward from an outer peripheral end of the central opening 112a. As shown in FIG. 10, the fan disk plate 112 and the plurality of vanes 114 are integrally formed. The plurality of vanes 114 extends leftward from the fan disk plate 112. Each of the vanes 114 has a shape in which, by seeing the fan 110 from the left side, a radially inner end of the vane 114 is located on a downstream side of a radially outer end of the vane 114 in a clockwise direction. As shown in FIG. 9, the cover part 116 is heat-sealed to left ends of the vanes 114. A cover-side air intake opening 116a is defined at a center of the cover part 116. A diameter of the cover-side air intake opening 116a is greater than a diameter of the central opening 112a. As shown in FIG. 11, a plurality of wind paths 110a is defined by a left surface of the fan disk plate 112, a right surface of the cover part 116, and two vanes 114 adjacent in a circumferential direction. As shown in FIG. 9, a plurality of fan air exhaust openings 110b is defined on an outer circumferential surface of the fan 110 in the circumferential direction.

Figure 12:
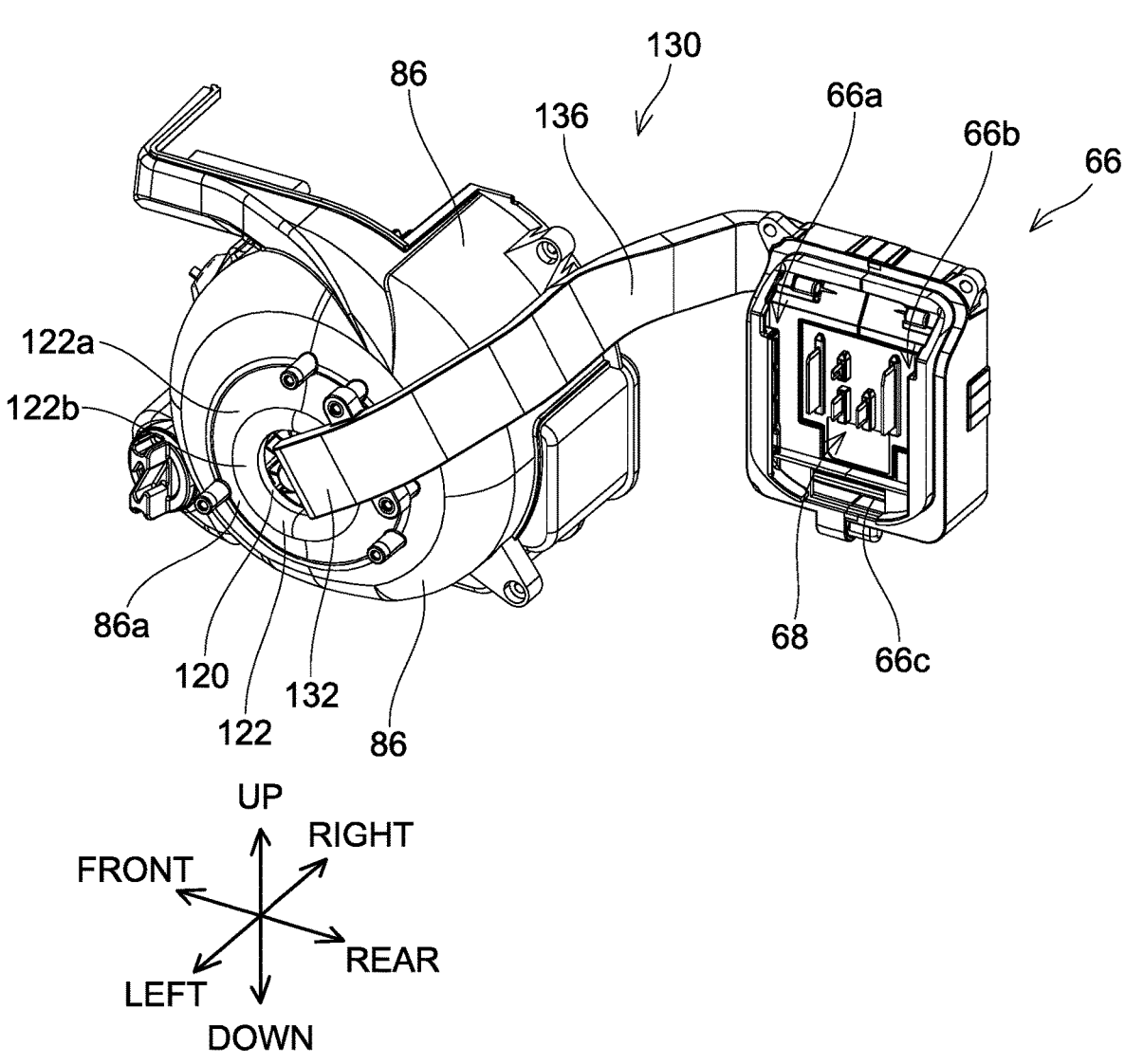
FIG. 12 illustrates a perspective view of an inner housing 86, the fan 110, a duct 130, and a receptacle unit 66 according to the first embodiment, seen from the rear left upper side.

The inner housing 86 in FIG. 12 is fixed to the right housing 26 (see FIG. 1) by screws. As shown in FIG. 8, an inner air intake opening 120 and a waterproof part 122 are arranged on a left wall part 86a of the inner housing 86. The waterproof part 122 comprises a diameter-reducing part 122a and a bell mouth part 122b. The diameter-reducing part 122a has its outer diameter and inner diameter reduced from right to left. The bell mouth part 122b is arranged at a left end of the diameter-reducing part 122a. The bell mouth part 122b has a shape which does not inhibit the leftward flow of air from the right side along an outer peripheral surface of the left wall part 86a and being suctioned into the motor accommodating part 88 through the inner air intake opening 120. The inner air intake opening 120 is defined by the bell mouth part 122b. A waterproof groove 124 recessed from the outer peripheral surface of the left wall part 86a is defined in the bell mouth part 122b. Specifically, the waterproof groove 124 is recessed radially inward from the outer peripheral surface of the left wall part 86a. A depth D1 of the waterproof groove 124 is constant an entirety of a circumference of the bell mouth part 122b.

Figure 13:
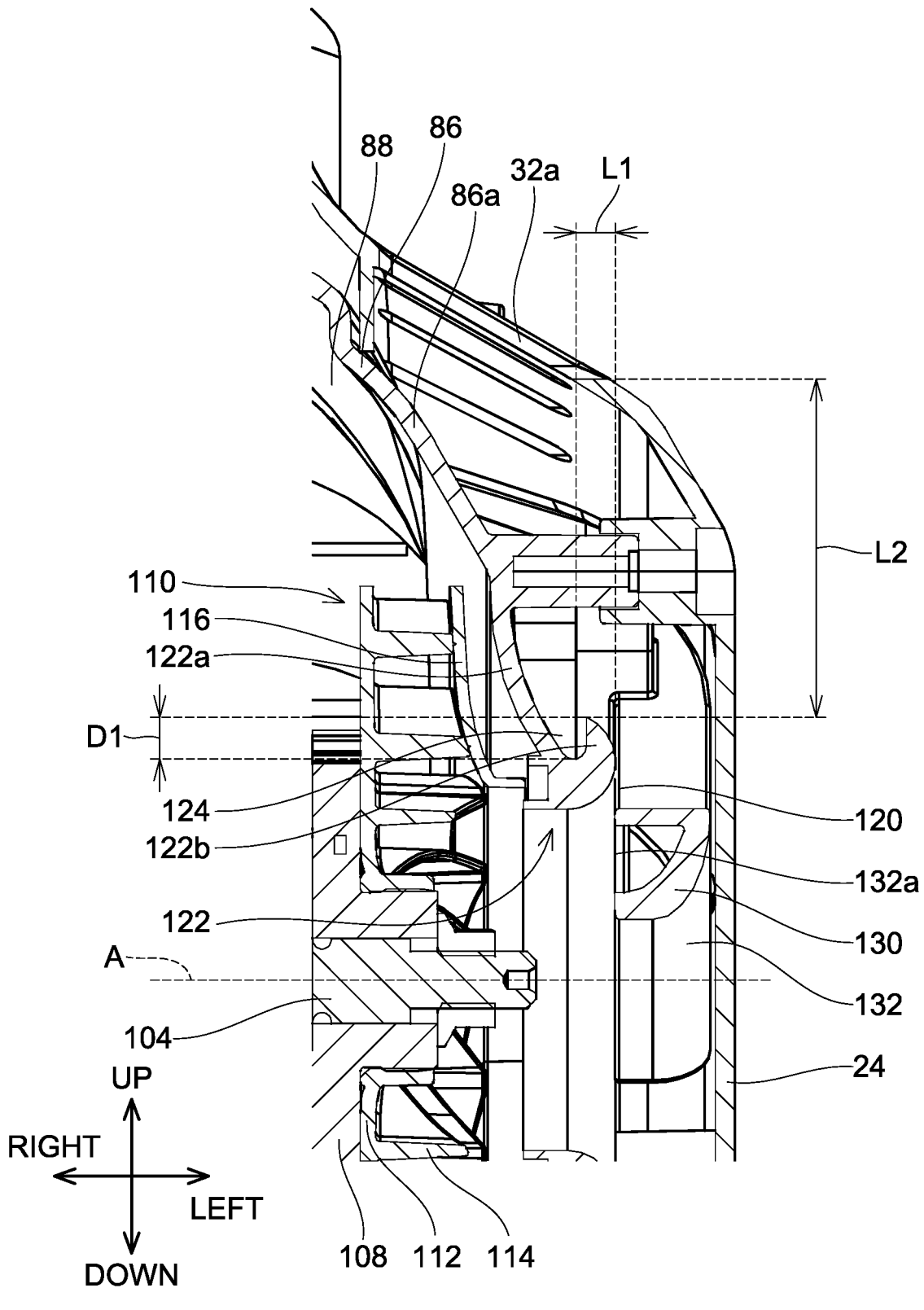
FIG. 13 illustrates a front cross-sectional view of the chainsaw 2 according to the first embodiment, seen from the front side.

As shown in FIG. 13, the inner air intake opening 120 is located to the left side of the outer air intake openings 32a by distance L1. The inner air intake opening 120 has a circular shape. The inner air intake opening 120 is disposed on the inner side of the outer air intake openings 32a. Here, "the inner air intake opening 120 is disposed on the inner side of the outer air intake openings 32a" means that air which flows into the chainsaw 2 from the outside passes through the outer air intake openings 32a and the inner air intake opening 120 sequentially in this order. As shown in FIG. 8, in the left-right direction, the inner air intake opening 120 is positioned farther away from the motor 92 than the outer air intake openings 32a is from the motor 92. As shown in FIG. 13, a distance L2 between a lower end of the outer air intake opening 32a that is located the highest and an upper end of the waterproof groove 124 is less than or equal to 10 cm.

Figure 14:
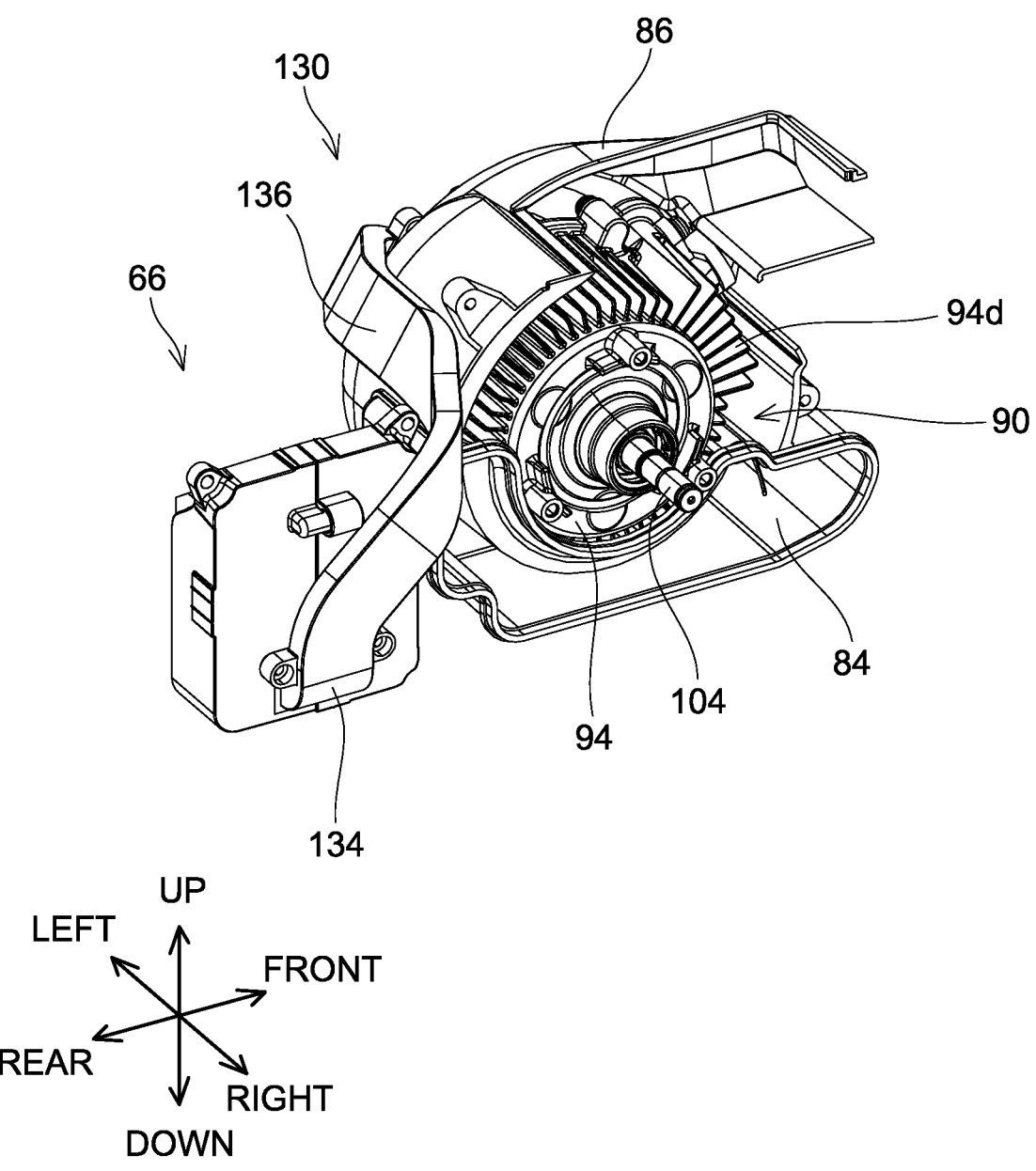
FIG. 14 illustrates a perspective view of the inner housing 86, a motor unit 82, the duct 130, and the receptacle unit 66 according to the first embodiment, seen from the rear right upper side.

As shown in FIG. 6, the duct 130 is accommodated in the body housing 10. As shown in FIG. 12, the duct 130 comprises a fan-side end 132, a receptacle-unit-side end 134 (see FIG. 14), and a flow path portion 136 which connects the fan-side end 132 and the receptacle-unit-side end 134. As shown in FIG. 8, the fan-side end 132 is disposed between the left surface of the left housing 24 and the left wall part 86a of the inner housing 86. A fan-side opening 132a is defined at the fan-side end 132 of the duct 130. The fan-side opening 132a faces the inner air intake opening 120 of the inner housing 86. An opening area of the fan-side opening 132a is one-third (⅓) times to one-half (½) times an opening area of the inner air intake opening 120. As shown in FIG. 14, the receptacle-unit-side end 134 of the duct 130 is attached to a lower part of a right surface of the receptacle unit 66. As shown in FIG. 7, a receptacle-unit-side opening 134a is defined on the receptacle-unit-side end 134.

Figure 15:
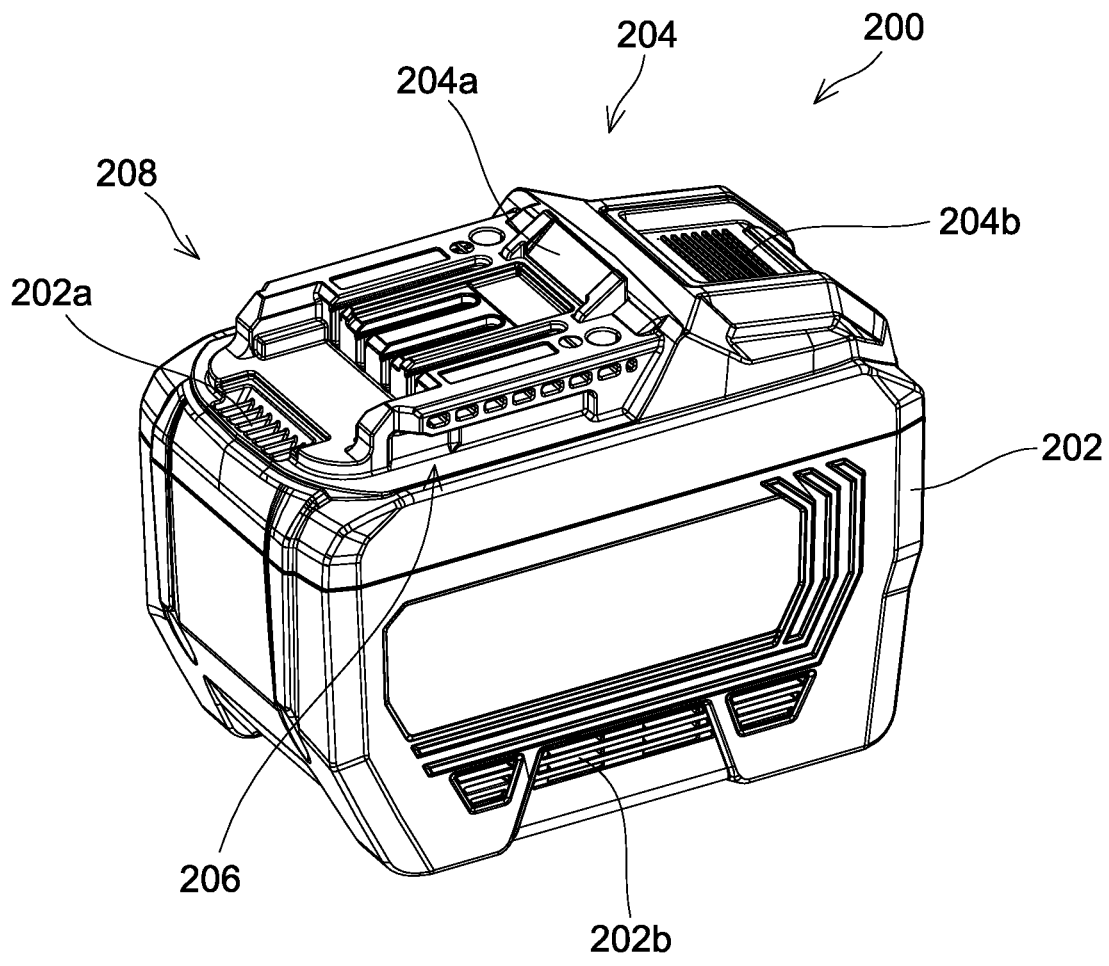
FIG. 15 illustrates a perspective view of the battery pack 200 according to the first embodiment, seen from front right lower side.
Figure 15:
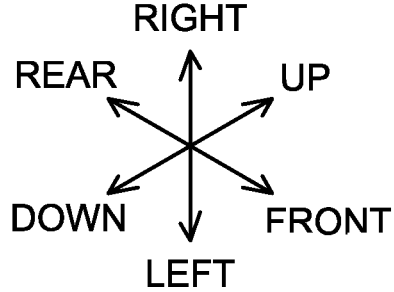

As shown in FIG. 15, the battery pack 200 comprises a battery housing 202. The battery housing 202 has a plurality of battery cells C (see FIG. 7) accommodated therein. The battery housing 202 comprises a hook 204, a second front rail 206 disposed at a front end of the battery housing 202, and a second rear rail 208 disposed at a rear end of the battery housing 202. The second front rail 206 and the second rear rail 208 respectively have shapes corresponding to the first front rail 66*a* and the first rear rail 66*b* (see FIG. 4) of the chainsaw 2. The hook 204 comprises an engaging portion 204*a* and a hook operation portion 204*b*. The hook 204 is biased outward of the battery housing 202 by a spring (not shown). When the battery pack 200 is to be attached to the battery IF 52 (see FIG. 4) of the chainsaw 2, the engaging portion 204*a* of the hook 204 enters an engaged portion 66*e* (see FIG. 7) of the receptacle unit 66 of the chainsaw 2, by which the battery pack 200 is fixed to the battery IF 52. By the hook operation portion 204*b* being pressed in from this state, the engaging portion 204*a* is disengaged from the engaged portion 66*e*. In this state, the battery pack 200 can be slid relative to the battery IF 52, and the battery pack 200 can be removed from the battery IF 52 (i.e., the chainsaw 2).

A first battery vent hole 202*a* is defined on a lower part of a right surface of the battery housing 202. As shown in FIG. 7, the first battery vent hole 202*a* faces an inner air exhaust hole 66*c* of the receptacle unit 66, with the battery pack 200 mounted in the chainsaw 2. As shown in FIG. 15, a second battery vent hole 202*b* is defined on a left part of a front surface of the battery housing 202. The second battery vent hole 202*b* faces the IF-side air intake opening 54*a* (see FIG. 4) on the IF front surface 54 of the battery IF 52, with the battery pack 200 mounted in the chainsaw 2.

How the air flows when the motor 92 of the chainsaw 2 is operating will be described. When the motor 92 in FIG. 8 is driven, the sprocket 106 and the fan 110 start rotating. In the present embodiment, the fan disk plate 112, the vanes 114, and the cover part 116 in the fan 110 rotate integrally. By the fan 110 being driven, air outside the body housing 10 passes through the outer air intake openings 32*a* of the left housing 24 and the inner air intake opening 120 of the inner housing 86 to be suctioned into the motor accommodating part 88. As shown in FIG. 6, the air having flowed in the motor accommodating part 88 passes around the motor cover 90. Due to this, the motor 92 within the motor cover 90 is cooled. Further, the air flowing in the motor accommodating part 88 cools the control unit 80 which defines the motor accommodating part 88. The air inside the motor accommodating part 88 is then discharged outside through the front air exhaust opening 88*a* on the front surface of the motor accommodating part 88.

Also, by the fan 110 being driven, the air inside the battery accommodating part 18 is suctioned into the motor accommodating part 88 through the duct 130. Specifically, as shown in FIG. 7, the air inside the battery accommodating part 18 passes through the second battery vent hole 202*b* (see FIG. 15) of the battery pack 200, the first battery vent hole 202*a* of the battery pack 200, the inner air exhaust hole 66*c* of the receptacle unit 66, the outer air exhaust hole 66*d* of the receptacle unit 66, and the receptacle-unit-side opening 134*a* of the duct 130 to be suctioned into the duct 130. The plurality of battery cells C within the battery pack 200 is cooled by the air flowing through the battery pack 200. As shown in FIG. 8, the air having flowed into the duct 130 passes through the fan-side opening 132*a* and the inner air intake opening 120 of the inner housing 86 to be suctioned into the motor accommodating part 88. How the air flows thereafter is the same as how the air having flowed inward from the outer air intake openings 32*a* of the left housing 24 flows.

As described above, the inside of the battery accommodating part 18 is tightly-sealed in the state where the battery cover 50 is closed. Due to this, when the operation of the motor 92 continues, that creates negative pressure inside the battery accommodating part 18. In this case, as shown in FIG. 6, the air inside the body housing 10 starts to be suctioned into the battery accommodating part 18. Specifically, the air inside the body housing 10 passes through the air intake tube 64 and the IF-side air intake opening 54*a* of the IF front surface 54 to be suctioned into the battery accommodating part 18.

When the operation of the motor 92 further continues, the inside of the body housing 10 is put under negative pressure as well. In this case, the air outside the body housing 10 starts to be suctioned into the body housing 10 through the rear air intake opening 70 defined on the lower part of the rear surface of the body housing 10. The air having flowed in the body housing 10 through the rear air intake opening 70 flows frontward and passes through the air intake tube 64 and the IF-side air intake opening 54*a* of the IF front surface 54 to flow into the battery accommodating part 18. As such, while the motor 92 is operating, the motor 92, the control unit 80, and the plurality of battery cells C within the battery pack 200 are cooled.

In one or more embodiments, as shown in FIGS. 1 and 8, the chainsaw 2 (example of "working machine") comprises: the saw chain 8 (example of "working part"); the body 4 including the motor accommodating part 88; the fan 110 accommodated in the motor accommodating part 88; and the motor 92 accommodated in the motor accommodating part 88 and configured to drive the saw chain 8 and the fan 110. The fan 110 comprises: the fan disk plate 112 (example of "disk plate") including the central opening 112*a* defined at a center of the fan disk plate 112; the plurality of vanes 114 attached to the fan disk plate 112; and the cover part 116, in which the plurality of vanes 114 is covered by the fan disk plate 112 and the cover part 116 in the axial direction A. According to the above configuration, the plurality of vanes 114 in the fan 110 is covered by the fan disk plate 112 and the cover part 116 in the axial direction A. In this case, the wind paths 110*a* in the radial direction are defined by the plurality of vanes 114, the fan disk plate 112, and the cover part 116. According to such configuration, an amount of air suctioned into the motor accommodating part 88 by the fan 110 can be increased as compared to a fan in which one side in the axial direction of the plurality of vanes 114 is not covered by the cover part 116. Accordingly, cooling performance for the motor 92 accommodated in the motor accommodating part 88 can be improved. The chainsaw 2 has a relatively-high power output. Due to this, the motor 92 easily generates heat. According to the above configuration, it is advantageous that the motor 92 within the motor accommodating part 88 can be appropriately cooled.

In one or more embodiments, as shown in FIG. 9, the cover part 116 is fixed (heat-sealed) to the plurality of vanes 114. According to the above configuration, the wind paths 110*a* in the radial direction are securely defined by the plurality of vanes 114, the fan disk plate 112, and the cover part 116. Accordingly, the amount of air suctioned in the motor accommodating part 88 can be increased, by which the cooling performance for the motor 92 accommodated in the motor accommodating part 88 can be improved.

In one or more embodiments, as shown in FIG. 8, the chainsaw 2 further comprises the motor cover 90 accommodating the motor 92, in which the fins 94*d* protruding outward are disposed on the outer peripheral surface of the motor cover 90. According to the above configuration, the air suctioned into the motor accommodating part 88 by the fan 110 makes contact with the fins 94*d*. When the air contacts the fins 94*d*, the motor 92 accommodated in the motor cover 90 is cooled. Accordingly, cooling performance for the motor 92 can be improved.

In one or more embodiments, as shown in FIG. 8, the chainsaw 2 further comprises the motor cover 90 configured to cover the motor 92 in the motor accommodating part 88, in which the motor cover 90 comprises a waterproof structure that prevents entry of water. When the motor cover 90 has a waterproof structure, air does not flow into the motor cover 90 even if the air is suctioned into the motor accommodating part 88 by the fan 110. In this case, the motor 92 accommodated in the motor cover 90 is cooled by the air being brought in contact with the outer peripheral surface of the motor cover 90. That is, the outer peripheral surface of the motor cover 90 needs to be exposed to a great amount of air as compared to the configuration where the air flows into the motor cover 90. According to the above configuration, a great amount of air is suctioned into the motor accommodating part 88 by the fan 110. Accordingly, cooling performance for the motor 92 can be improved while water is prevented from being attached on the motor 92.

In one or more embodiments, as shown in FIGS. 6, 7, 11, and 12, the body 4 comprises: the battery pack 200; the battery accommodating part 18 configured to accommodate the battery pack 200; and the duct 130. The battery accommodating part 18 comprises the IF-side air intake opening 54*a* (example of "first air intake opening") for intaking air from inside of the body 4 into the battery accommodating part 18 and the inner air exhaust hole 66*c* (example of "first air exhaust opening") for exhausting air from the battery accommodating part 18 to the inside of the body 4. The motor accommodating part 88 comprises: the left wall part 86*a* (example of "wall") positioned on the left side (example of "first side") than the motor 92 in the axial direction A and defining the motor accommodating part 88; and the inner air intake opening 120 (example of "second air intake opening") defined on the left wall part 86*a*. The receptacle-unit-side end 134 (example of "one end") of the duct 130 is connected to the battery accommodating part 18, and the fan-side end 132 (example of "another end") of the duct 130 faces the inner air intake opening 120 on the left side of the inner air intake opening 120. According to the above configuration, when the fan 110 is driven, air within the battery accommodating part 18 is suctioned in to the duct 130. Inside of the battery accommodating part 18 is put under negative pressure when the air within the battery accommodating part 18 has been suctioned into the duct 130. In this case, the air inside the body 4 starts to be suctioned into the battery accommodating part 18. Due to this, the battery pack 200 within the battery accommodating part 18 is cooled. Accordingly, the fan 110 makes it possible for both the motor 92 and the battery pack 200 to be cooled.

In one or more embodiments, the fan-side opening 132*a* defined on the fan-side end 132 of duct 130 has the opening area being one-third or more of the opening area of the inner air intake opening 120. According to the above configuration, the amount of air within the battery accommodating part 18 which is suctioned into the duct 130 can be increased. In this case, the amount of air which is suctioned into the battery accommodating part 18 from the inside of the body 4 can be increased as well. Accordingly, cooling performance for the battery pack 200 can be improved.

In one or more embodiments, as shown in FIG. 7, the body 4 comprises the rear air intake opening 70 (example of "third air intake opening") for intaking air from outside of the body 4 into the inside of the body 4. In the front-rear direction (example of "direction orthogonal to the axial direction A"), the battery accommodating part 18 is disposed between the motor accommodating part 88 and the rear air intake opening 70. According to the above configuration, the air suctioned into the inside of the body 4 from the rear air intake opening 70 can be utilized to cool the battery pack 200 within the battery accommodating part 18. Accordingly, cooling performance for the battery pack 200 can be improved as compared to a configuration where no rear air intake opening 70 is provided.

Second Embodiment

Figure 16:
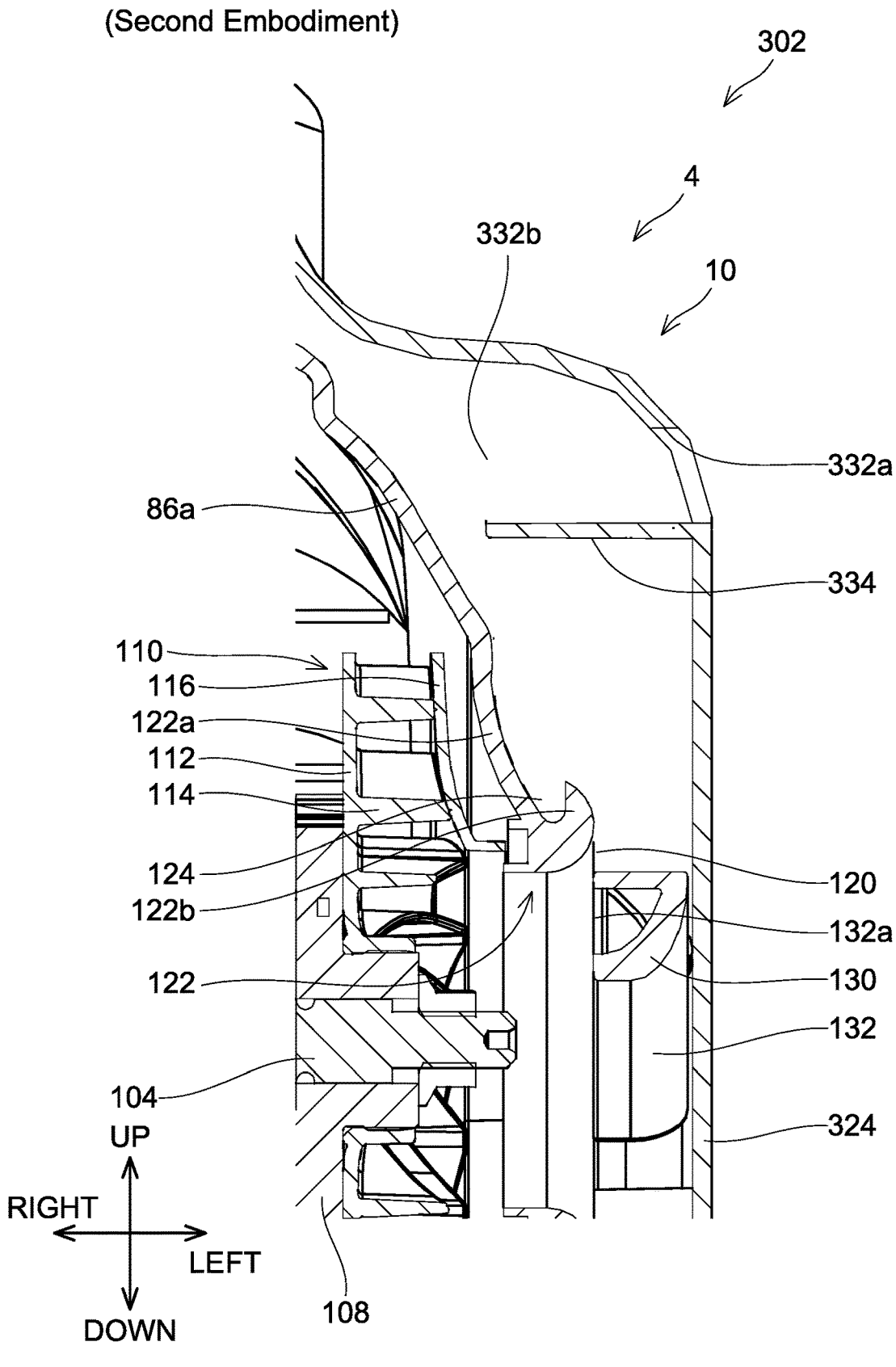
FIG. 16 illustrates a chainsaw 302 according to a second embodiment, seen from the front side.

As shown in FIG. 16, a chainsaw 302 according to the second embodiment will be described. The chainsaw 302 of the second embodiment has a left housing 324 with a different structure from the left housing 24 (see FIG. 8) according to the first embodiment. Hereafter, descriptions for like configurations between the embodiments may be omitted as the same reference numerals will be given to the like configurations.

The left housing 324 comprises a plurality of the outer air intake openings 332*a*, a plurality of the left air intake openings 332*b* disposed on the right side of the outer air intake openings 332*a*, and the right extension part 334 that connects the outer air intake openings 332*a* and the left air intake openings 332*b*. In the present embodiment, the plurality of outer air intake openings 332*a* and the plurality of left air intake openings 332*b* are aligned in the front-rear direction. The plurality of outer air intake openings 332*a* and the plurality of left air intake openings 332*b* are disposed higher than the inner air intake opening 120.

Third Embodiment

A chainsaw 402 according to a third embodiment will be described with reference to FIGS. 17, 18. The chainsaw 402 of the third embodiment has a left wall part 486*a* of an inner housing 486 with a different structure from the left wall part 86*a* (see FIGS. 8, 13) of the inner housing 86 according to the first embodiment.

Figure 17:
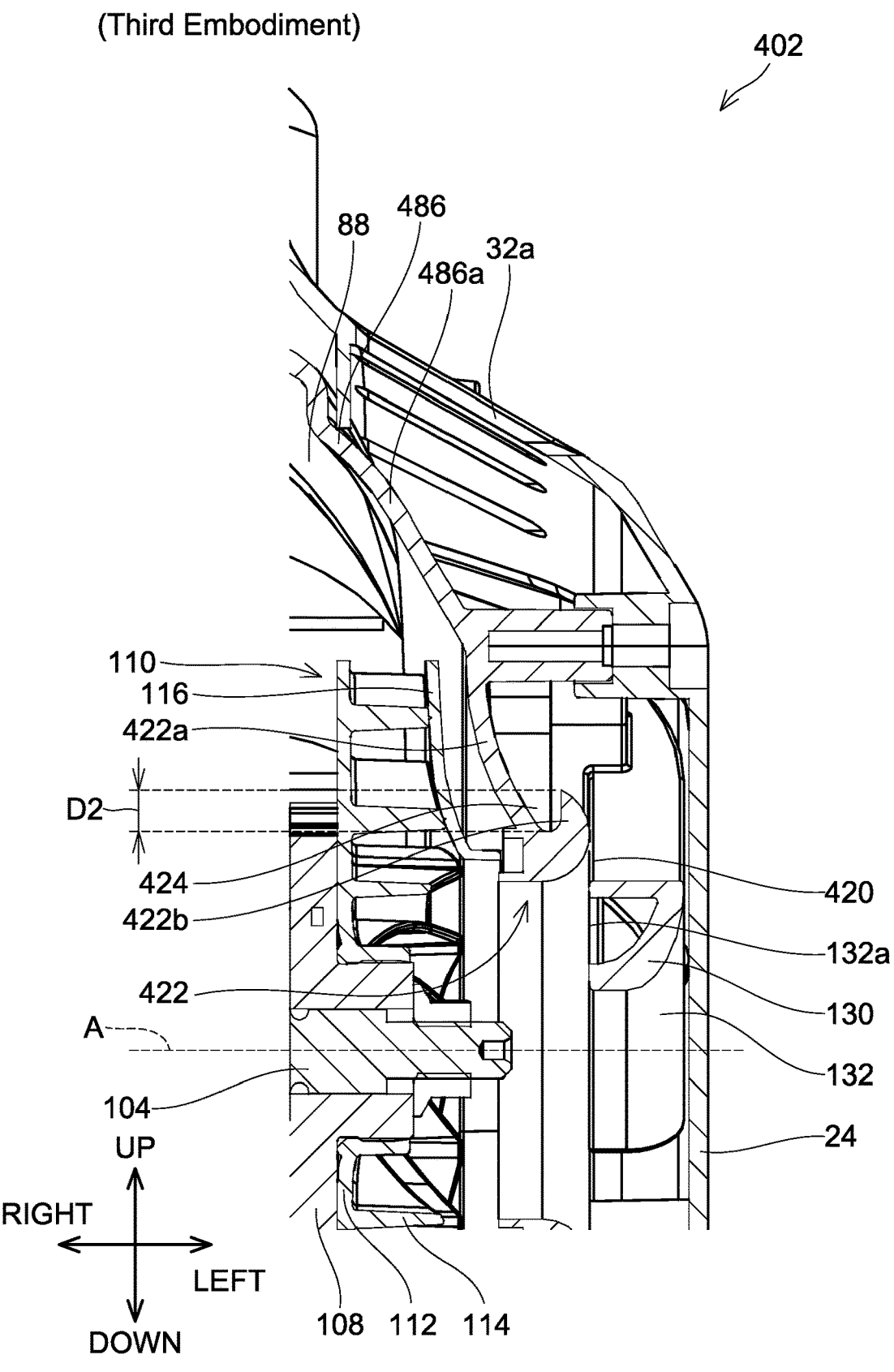
FIG. 17 illustrates a front cross-sectional view of a chainsaw 402 according to a third embodiment seen from the front side.
Figure 18:
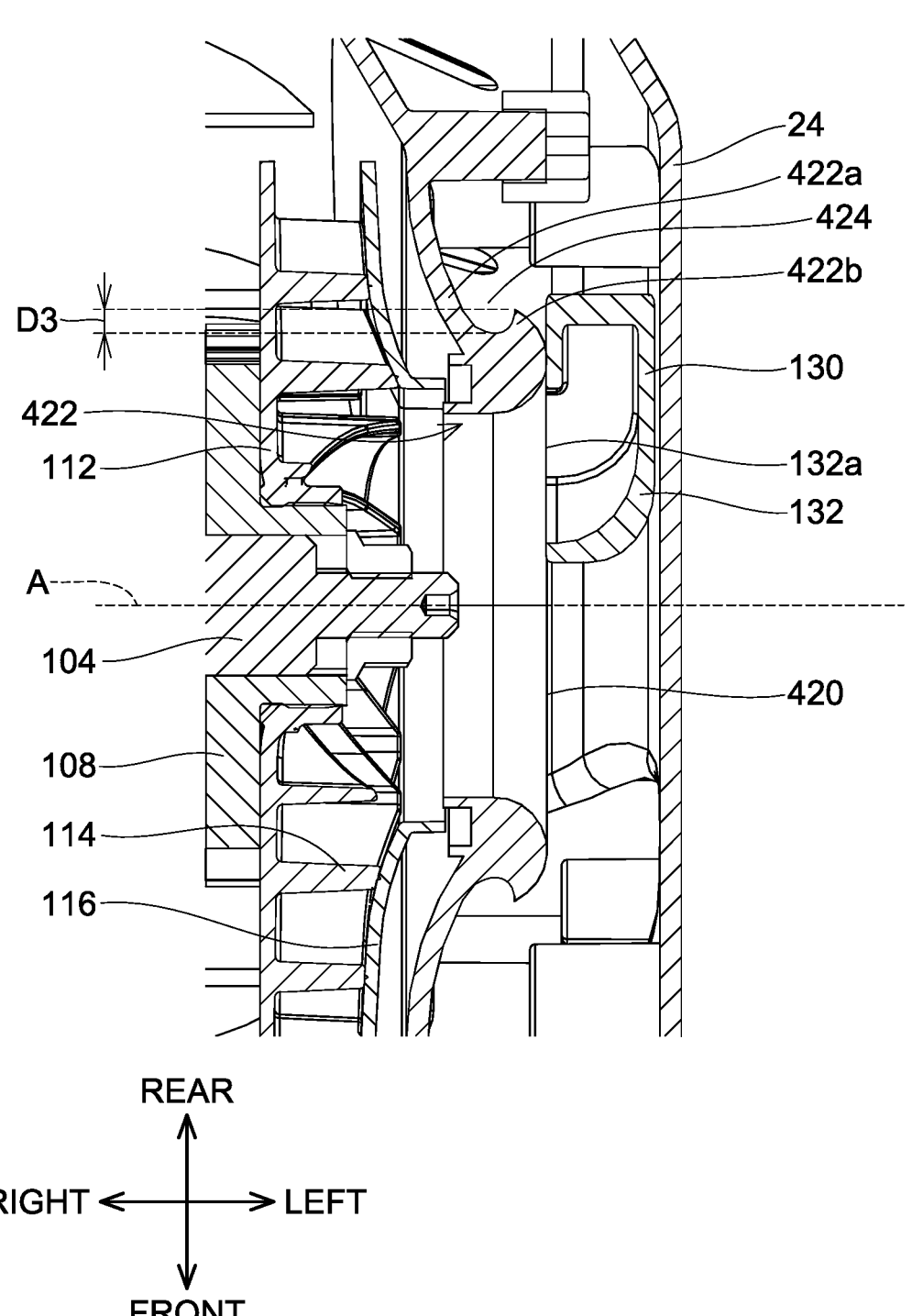
FIG. 18 illustrates a top cross-sectional view of the chainsaw 402 according to the third embodiment seen from the front side.

As shown in FIG. 17, an inner air intake opening 420 and a waterproof part 422 are disposed on the left wall part 486*a* of the inner housing 486. The waterproof part 422 comprises a diameter-reducing part 422*a* and a bell mouth part 422*b* extending radially outward from a left end of the diameter-reducing part 422*a*. The diameter-reducing part 422*a* has an inner diameter and an outer diameter which reduce from right to left. The bell mouth part 422*b* is disposed at the left end of the diameter-reducing part 422*a*. The inner air intake opening 420 is defined by the bell mouth part 422*b*. A waterproof groove 424 recessed from an outer peripheral surface of the left wall part 486*a* is disposed in the bell mouth part 422*b*. In details, the waterproof groove 424 is recessed radially inward from the outer circumferential surface of the left wall part 486*a*. A depth of the waterproof groove 424 is a maximum depth D2 at upper and lower portions of the waterproof groove 424. Further, as shown in FIG. 18, the depth of the waterproof groove 424 is a minimum depth D3 at left and right portions of the waterproof groove 424. The depth D3 is smaller than the depth D2. In the present embodiment, the depth of the waterproof groove 424 varies along its circumferential direction. In other words, the depth of the waterproof groove 424 is not constant along its entire circumference.

(First Variant) "Working machine" may not be limited to the chainsaw 2, and also may be a pole saw, a blower, a grass trimmer, a hedge trimmer, a pressure washer, a sprayer, a lawn mower, a scarifier, a cultivator, for example.

(Second Variant) The fan 110 may comprise a cover part composed by the left wall part 86*a* of the inner housing 86, instead of the cover part 116. In the present variant, a distance between the plurality of vanes 114 and the left wall part 86*a* is substantially zero. In the present variant, when the motor 92 is driven, the fan disk plate 112 and the vanes 114 rotate, but the cover part constituted of the left wall part 86*a* of the inner housing 86 does not rotate. According to such configuration also, an air flow path in the radial direction is defined by the fan disk plate 112, the vanes 114, and the cover part. Due to this, the amount of air suctioned into the motor accommodating part 88 by the fan can be increased. Also, in another variant, the fan 110 may comprise the cover part constituted of the body housing 10, instead of the cover part 116.

(Third Variant) The fan 110 may be disposed on the left side (that is, downstream) of the motor 92.

(Fourth Variant) The motor 92 may not be accommodated in the motor cover 90.

(Fifth Variant) The motor cover 90 may not have a waterproof structure. In the present variant, degree of waterproofing can be improved as compared to a configuration where the motor 92 is not covered by the motor cover 90.

(Sixth Variant) The battery accommodating part 18 may not comprise the IF-side air intake opening 54*a*. In the present variant, cooling performance for the motor 92 can be improved as compared to the configuration where both the motor 92 and the battery pack 200 are cooled by the fan 110.

(Seventh Variant) An opening area of the fan-side opening 132*a* may be less than one-third of an opening area of the inner air intake opening 120. Further, the fan-side opening 132*a* may not face the inner air intake opening 120 of the inner housing 86.

(Eighth Variant) The body 4 may not comprise the rear air intake opening 70.

(Ninth Variant) The motor 92 may be a brushed DC motor, or any other type of motor such as AC motor.

The invention claimed is:

1. A working machine comprising:
a working part;
a body including a motor accommodating part;
a fan accommodated in the motor accommodating part; and
a motor accommodated in the motor accommodating part and configured to drive the working part and the fan,
wherein the fan comprises:
    a disk plate including a circular opening defined at a center of the disk plate;
    a plurality of vanes attached to the disk plate; and
    a cover part, and
wherein the plurality of vanes is covered by the disk plate and the cover part in an axial direction, wherein
the body comprises:
    a battery pack;
    a battery accommodating part configured to accommodate the battery pack; and
    a duct,
wherein the battery accommodating part comprises a first air intake opening for intaking air from inside of the body into the battery accommodating part and a first air exhaust opening for exhausting air from the battery accommodating part to the inside of the body,
the motor accommodating part comprises:
    a wall positioned on a first side of the motor in the axial direction and defining the motor accommodating part; and
    a second air intake opening defined on the wall,
wherein one end of the duct is connected to the battery accommodating part, and
another end of the duct faces the second air intake opening on the first side of the second air intake opening.

2. The working machine according to claim 1, wherein the cover part is fixed to the plurality of vanes.

3. The working machine according to claim 1, further comprising
a motor cover accommodating the motor,
wherein fins protruding outward are disposed on an outer peripheral surface of the motor cover.

4. The working machine according to claim 1, further comprising
a motor cover configured to cover the motor in the motor accommodating part,
wherein the motor cover comprises a waterproof structure that prevents entry of water.

5. The working machine according to claim 1, wherein an opening defined on a surface of the other end of duct has an opening area being one-third or more of an opening area of the second air intake opening, wherein the surface of the other end of duct faces the second air intake opening.

6. The working machine according to claim 1, wherein the body comprises a third air intake opening for intaking air from outside of the body into the inside of the body,
wherein in a direction orthogonal to the axial direction, the battery accommodating part is disposed between the motor accommodating part and the third air intake opening.

7. The working machine according to claim 1, wherein the working machine is a chainsaw.

8. A working machine comprising:
a working part;
a body including a motor accommodating part;
a fan accommodated in the motor accommodating part; and
a motor accommodated in the motor accommodating part and configured to drive the working part and the fan,
wherein the fan comprises:
    a disk plate including a circular opening defined at a center of the disk plate;
    a plurality of vanes attached to the disk plate; and
    a cover part, and
wherein the plurality of vanes is covered by the disk plate and the cover part in an axial direction,
wherein the cover part is fixed to the plurality of vanes,
the working machine further comprises:
a motor cover accommodating the motor,
wherein fins protruding outward are disposed on an outer peripheral surface of the motor cover,
wherein the motor cover is configured to cover the motor in the motor accommodating part,
the motor cover comprises a waterproof structure that prevents entry of water,
wherein the body comprises:
    a battery pack;
    a battery accommodating part configured to accommodate the battery pack; and
    a duct, wherein the battery accommodating part comprises a first air intake opening for intaking air from inside of the body into the battery accommodating part and a first air exhaust opening for exhausting air from the battery accommodating part to the inside of the body, the motor accommodating part comprises:

a wall positioned on a first side of the motor in the axial direction and defining the motor accommodating part; and a second air intake opening disposed on the wall, wherein one end of the duct is connected to the battery accommodating part, and another end of the duct faces the second air intake opening on the first side of the second air intake opening, wherein an opening defined on a surface of the other end of duct has an opening area being one-third or more of an opening area of the second air intake opening, wherein the surface of the other end of duct faces the second air intake opening, wherein the body comprises a third air intake opening for intaking air from outside of the body to the inside of the body, wherein in a direction orthogonal to the axial direction, the battery accommodating part is disposed between the motor accommodating part and the third air intake opening, and wherein the working machine is a chainsaw.

* * * * *